United States Patent
Kuwajima et al.

(10) Patent No.: US 9,923,240 B2
(45) Date of Patent: Mar. 20, 2018

(54) ELECTROLYTE SOLUTION, ELECTROCHEMICAL DEVICE, LITHIUM BATTERY, AND MODULE

(71) Applicant: DAIKIN INDUSTRIES, LTD., Osaka-Shi, Osaka (JP)

(72) Inventors: Yoshiko Kuwajima, Settsu (JP); Meiten Koh, Settsu (JP); Akiyoshi Yamauchi, Settsu (JP); Hideo Sakata, Settsu (JP); Hitomi Miyawaki, Decatur, AL (US); Akinori Tani, Settsu (JP); Shinichi Kinoshita, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/431,427

(22) PCT Filed: Sep. 25, 2013

(86) PCT No.: PCT/JP2013/075879
§ 371 (c)(1),
(2) Date: Mar. 26, 2015

(87) PCT Pub. No.: WO2014/050873
PCT Pub. Date: Apr. 3, 2014

(65) Prior Publication Data
US 2015/0236378 A1  Aug. 20, 2015

(30) Foreign Application Priority Data
Sep. 28, 2012 (JP) ................ 2012-218674

(51) Int. Cl.
| | |
|---|---|
| H01M 10/0567 | (2010.01) |
| H01M 10/0525 | (2010.01) |
| H01M 10/0568 | (2010.01) |
| H01M 4/505 | (2010.01) |
| H01M 4/525 | (2010.01) |
| H01M 4/587 | (2010.01) |

(52) U.S. Cl.
CPC ....... *H01M 10/0567* (2013.01); *H01M 4/505* (2013.01); *H01M 4/525* (2013.01); *H01M 4/587* (2013.01); *H01M 10/0525* (2013.01); *H01M 10/0568* (2013.01); *H01M 2300/0025* (2013.01)

(58) Field of Classification Search
CPC ......... H01M 10/0525; H01M 10/0567; H01M 10/0568; H01M 4/505; H01M 4/525; H01M 4/587
See application file for complete search history.

(56) References Cited

U.S. PATENT DOCUMENTS

| 5,626,981 A | 5/1997 | Simon et al. |
|---|---|---|
| 6,040,090 A * | 3/2000 | Sunagawa et al. ...... 429/231.95 |
| 2001/0053485 A1 | 12/2001 | Shibuya et al. |
| 2004/0048152 A1 * | 3/2004 | Yata et al. ............. 429/162 |
| 2006/0160000 A1 * | 7/2006 | Kim ..................... 429/332 |
| 2006/0204840 A1 * | 9/2006 | Jeon .............. H01M 2/1077 429/152 |
| 2009/0086408 A1 | 4/2009 | Koh et al. |
| 2010/0033899 A1 | 2/2010 | Koh et al. |
| 2010/0047694 A1 * | 2/2010 | Chu ............. H01M 4/505 429/232 |
| 2010/0062344 A1 | 3/2010 | Koh et al. |
| 2011/0008681 A1 | 1/2011 | Koh et al. |
| 2011/0183199 A1 * | 7/2011 | Abe ..................... 429/188 |

(Continued)

FOREIGN PATENT DOCUMENTS

| EP | 1890357 A1 | 2/2008 |
|---|---|---|
| EP | 2475041 A1 | 7/2012 |

(Continued)

OTHER PUBLICATIONS

Yuki Matsuda et al., "Safety improvement of lithium ion batteries by organo-fluorine compounds," Journal of Fluorine Chemistry, 2011, pp. 1174-1181, vol. 132.
International Search Report of PCT/JP2013/075879 dated Nov. 26, 2013.
Machine translation for JP 2012-216391.
Communication dated Jan. 12, 2016 from the European Patent Office in counterpart application No. 13841450.3.
International Search Report dated Nov. 26, 2013 from the International Searching Authority in counterpart Application No. PCT/JP2013/075877.
International Preliminary Report on Patentability dated Mar. 31, 2015 from the International Searching Authority in counterpart Application No. PCT/JP2013/075877.

(Continued)

*Primary Examiner* — Anca Eoff
(74) *Attorney, Agent, or Firm* — Sughrue Mion, PLLC

(57) ABSTRACT

An object of the present invention is to provide a lithium cell exhibiting a high remaining capacity after high-temperature storage even if used at high voltages, and an electrolytic solution used for the cell. The present invention relates to an electrolytic solution containing a nonaqueous solvent; an electrolyte salt; and 10 vol % or more of a compound represented by the following formula (1) based on 100 vol % of the nonaqueous solvent,

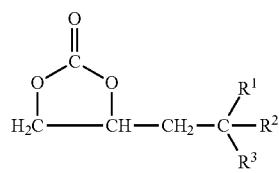

(1)

wherein $R^1$, $R^2$ and $R^3$ may be the same as or different from one another, each representing a hydrogen atom, a fluorine atom, a $C_1$-$C_{20}$ alkyl group, or a $C_1$-$C_{20}$ fluorinated alkyl group, excluding cases where all of $R^1$, $R^2$, and $R^3$ are hydrogen atoms or fluorine atoms.

6 Claims, No Drawings

(56) References Cited

U.S. PATENT DOCUMENTS

| | | |
|---|---|---|
| 2012/0183867 A1 | 7/2012 | Koh et al. |
| 2014/0023916 A1 | 1/2014 | Koh et al. |
| 2015/0318572 A1 | 11/2015 | Kuwajima et al. |

FOREIGN PATENT DOCUMENTS

| | | | |
|---|---|---|---|
| EP | 2479832 A1 | 7/2012 | |
| JP | 04087156 A | 3/1992 | |
| JP | 05325985 A | 12/1993 | |
| JP | 0845545 A | 2/1996 | |
| JP | 08037025 A | 2/1996 | |
| JP | 10189043 A | 7/1998 | |
| JP | 10233345 A | 9/1998 | |
| JP | 10247519 A | 9/1998 | |
| JP | 2001313075 A | 11/2001 | |
| JP | 2003168480 A | 6/2003 | |
| JP | 2012-067017 A | 4/2012 | |
| JP | 2012216391 A | 8/2012 | |
| JP | 2012216551 A | 11/2012 | |
| WO | 2006/106655 A1 | 10/2006 | |
| WO | 2008/096729 A1 | 8/2008 | |
| WO | 2009035085 A1 | 3/2009 | |
| WO | 2011/034162 A1 | 3/2011 | |
| WO | WO 2012/133902 | * 10/2012 | |
| WO | 2012/146525 A1 | 11/2012 | |

OTHER PUBLICATIONS

International Preliminary Report on Patentability dated Mar. 31, 2015 from the International Searching Authority in counterpart Application No. PCT/JP2013/075879.

Takashi Achiha et al.;"Electrochemical Behavior of Nonflammable Organ-Fluorine Compounds for Lithium Ion Batteries"; Journal of the Electrochemical Society, 156 (6); 2009 pp. A483-A488.

Takashi Achiha et al.;"Thermal Stability and Electrochemical Properties of Fluorine Compounds as Nonflammable Solvents for Lithium-Ion Batteries"; Journal of the Electrochemical Society; 157 (6); 2010 pp. A707-A712.

Communication dated Feb. 18, 2016 from the U.S. Patent and Trademark Office in U.S. Appl. No. 14/430,240.

Communication dated Feb. 11, 2016 from the European Patent Office in Application No. 13840561.8.

* cited by examiner understand# ELECTROLYTE SOLUTION, ELECTROCHEMICAL DEVICE, LITHIUM BATTERY, AND MODULE

CROSS REFERENCE TO RELATED APPLICATIONS

This is a National Stage of International Application No. PCT/JP2013/075879 filed Sep. 25, 2013, claiming priority based on Japanese Patent Application No. 2012-218674 filed Sep. 28, 2012, the contents of all of which are incorporated herein by reference in their entirety.

TECHNICAL FIELD

The present invention relates to an electrolytic solution, an electrochemical device, a lithium cell, and a module.

BACKGROUND ART

Nonaqueous electrolytic batteries such as nonaqueous electrolytic batteries have been put into practical use as a wide variety of power sources from power sources for portable electronic devices (e.g. cellphones, laptops) to in-vehicle power sources for driving (e.g. for automobiles) and stationary large-sized power sources. However, the recent enhancement of the performance of electronic devices and use of such batteries as in-vehicle power sources for driving and as stationary large-sized power sources have increased the demand for secondary batteries used. That is, the secondary batteries have been desired to exhibit enhanced battery characteristics such as an increased capacity, high-temperature storage characteristics, and cycle characteristics.

Typical electrolytic solutions used for nonaqueous electrolytic cells mainly contain an electrolyte and a nonaqueous solvent. The main component of the nonaqueous solvent is, for example, a cyclic carbonate as a high dielectric solvent (e.g. ethylene carbonate, propylene carbonate), a linear carbonate as a low viscosity solvent (e.g. dimethyl carbonate, diethyl carbonate, ethyl methyl carbonate), or a cyclic carboxylate (e.g. γ-butyrolactone, γ-valerolactone).

Also, various nonaqueous solvents, electrolytes, and auxiliary agents have been developed in order to improve the cell characteristics (e.g. load characteristics, cycle characteristics, storage characteristics, low-temperature characteristics) of cells utilizing any of the above nonaqueous electrolytic solutions. For example, Patent Literature documents 1 and 2 disclose improvement of the storage characteristics and cycle characteristics of a cell using vinylene carbonate, a derivative thereof, or a vinylethylene carbonate derivative for a nonaqueous electrolytic solution including a carbon material as the negative electrode such that the cyclic carbonate having a double bond preferentially reacts with the negative electrode to form a high-quality film on the surface of the negative electrode.

Also, use of a fluorinated cyclic carbonate as an electrolytic solution has been suggested. For example, Patent Literature documents 3 to 7 suggest use of a compound obtained by partially substituting hydrogen atoms of ethylene carbonate with fluorine atoms, and Patent Literature documents 8 and 9 suggest use of a compound obtained by partially or fully substituting hydrogen atoms in methyl groups of propylene carbonate with fluorine atoms.

Patent Literature document 10 suggests an electrolytic solution that contains an electrolyte salt and a fluorine-containing cyclic carbonate containing a fluorine-containing ether group or a $C_2$ or higher fluorinated alkyl group.

Furthermore, Non Patent Literature documents 1 to 3 teaches the electrochemical behaviors, thermal stability, and electrochemical characteristics of an organofluorine compound including a fluorinated cyclic carbonate containing a fluorine-containing ether group or a $C_2$ or higher fluorinated alkyl group, in a lithium ion cell.

CITATION LIST

Patent Literature

Patent Literature 1: JP H08-45545 A
Patent Literature 2: JP H04-87156 A
Patent Literature 3: JP H05-325985 A
Patent Literature 4: JP H10-189043 A
Patent Literature 5: JP H10-247519 A
Patent Literature 6: JP 2001-313075 A
Patent Literature 7: JP 2003-168480 A
Patent Literature 8: JP H10-233345 A
Patent Literature 9: WO 2006/106655
Patent Literature 10: JP H08-37025 A

Non Patent literature

Non Patent Literature 1: Takashi Achiha, and six other persons, "Electrochemical Behavior of Nonflammable Organo-Fluorine Compounds for Lithium Ion Batteries", Journal of The Electrochemical Society, 156(6), A483-A488 (2009)
Non Patent Literature 2: Takashi Achiha, and six other persons, "Thermal Stability and Electrochemical Properties of Fluorine Compounds as Nonflammable Solvents for Lithium-Ion Batteries", Journal of The Electrochemical Society, 157(6), A707-A712 (2010)
Non Patent Literature 3: Yuki Matsuda, and six other persons, "Safety improvement of lithium ion batteries by organo-fluorine compounds", Journal of Fluorine Chemistry, 132(2011)1174-1181

SUMMARY OF INVENTION

Technical Problem

As described above, the recent increase in the demand for enhancement of cell performance has increased the demand for improving the characteristics of cells containing a nonaqueous electrolytic solution, i.e., demands for an increased capacity, high-temperature storage characteristics, and cycle characteristics. In a nonaqueous electrolytic cell containing the electrolytic solution described in Patent Literature document 1 or 2, leaving a charged cell to stand at high temperatures or performing continuous charge and discharge cycles causes a problem of oxidative degradation of unsaturated cyclic carbonate or a derivative thereof on the positive electrode to generate carbon dioxide gas. Generation of carbon dioxide gas under such a use environment may, for example, make the cell unusable due to factors such as activation of safety valves of the cell at an inappropriate timing or expansion of the cell.

Nonaqueous electrolytic cells containing the electrolytic solution described in any of Patent Literature documents 3 to 10 are not enough to solve the above problems.

The present invention solves the above problems by providing a lithium cell having a high remaining capacity after high-temperature storage even if used at high voltages, and an electrolytic solution used for the lithium cell.

Solution to Problem

The present inventors have found that use of an electrolytic solution containing a certain amount of a compound represented by the following formula (1), a nonaqueous solvent, and an electrolyte salt enables production of a lithium cell having a high remaining capacity after high-temperature storage even if used at high voltages.

That is, one aspect of the present invention is an electrolytic solution containing a nonaqueous solvent;

an electrolyte salt; and 10 vol % or more of a compound represented by the following formula (1) based on 100 vol % of the nonaqueous solvent.

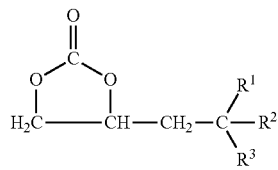

(1)

In the formula, $R^1$, $R^2$ and $R^3$ may be the same as or different from one another, each representing a hydrogen atom, a fluorine atom, a $C_1$-$C_{20}$ alkyl group, or a $C_1$-$C_{20}$ fluorinated alkyl group, where at least one of $R^1$, $R^2$, and $R^3$ is a fluorine atom or a fluorinated alkyl group.

Preferably, the electrolytic solution contains 0.2 mol/L or more of $LiPF_6$ as the electrolyte salt.

Another aspect of the present invention is an electrochemical device containing the above electrolytic solution.

Yet another aspect of the present invention is a lithium cell including: a negative electrode and a positive electrode that are capable of occluding or releasing lithium ions; a separator; and the above electrolytic solution.

Preferably, the positive electrode capable of occluding or releasing lithium ions contains a positive electrode active material formed from a lithium transition metal oxide represented by the following formula (2):

$$Li_{1+w}Mn_xNi_yCo_zO_2 \quad (2)$$

wherein w, x, y, and z satisfy the relations $0 \leq w < 0.4$, $0.3 < x < 1$, $0 \leq y < 0.4$, $0 \leq z < 0.4$, $0 < y+z$, and $w+x+y+z=1$.

Preferably, the negative electrode capable of occluding or releasing lithium ions contains at least one negative electrode active material selected from the group consisting of carbonaceous materials and metallic materials.

Preferably, the positive electrode is at a potential of 4.3 V or higher based on metallic lithium.

Yet another aspect of the present invention is a module including the above secondary lithium cell.

Advantageous Effects of Invention

Use of the electrolytic solution of the present invention enables production of a nonaqueous electrolytic cell exhibiting improved durability and load characteristics of the cell such as high-temperature storage.

DESCRIPTION OF EMBODIMENTS

The present invention is an electrolytic solution containing a nonaqueous solvent;

an electrolyte salt; and
a compound represented by the following formula (1).

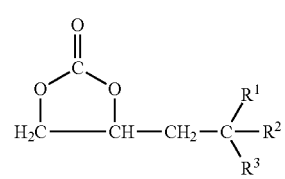

(1)

In the formula, $R^1$, $R^2$ and $R^3$ may be the same as or different from one another, each representing a hydrogen atom, a fluorine atom, a $C_1$-$C_{20}$ alkyl group, or a $C_1$-$C_{20}$ fluorinated alkyl group, excluding cases where all of $R^1$, $R^2$, and $R^3$ are hydrogen atoms or fluorine atoms.

The electrolytic solution of the present invention contains a compound represented by the formula (1).

In the formula (1), $R^1$, $R^2$ and $R^3$ may be the same as or different from one another, each representing a hydrogen atom, a fluorine atom, a $C_1$-$C_{20}$ alkyl group, or a $C_1$-$C_{20}$ fluorinated alkyl group.

Here, cases where all of $R^1$, $R^2$, and $R^3$ are hydrogen atoms or fluorine atoms are excluded.

The "fluorinated alkyl group" herein refers to an alkyl group obtained by partially or fully substituting hydrogen atoms of the alkyl group with fluorine atoms.

If the number of carbon atoms of the alkyl group and the fluorinated alkyl group is 20 or greater, the molecular weight of these groups is high, which increases the viscosity to lead to high resistance. Accordingly, the number of carbon atoms is 1 to 20, preferably 1 to 10, and more preferably 1.

In the formula (1), at least one of $R^1$, $R^2$, and $R^3$ is preferably a fluorine atom or a fluorinated alkyl group, is more preferably a fluorine atom, and still more preferably contains at least one of a fluorine atom and $CF_3$.

Specific examples of the compound represented by the formula (1) include the following compounds.

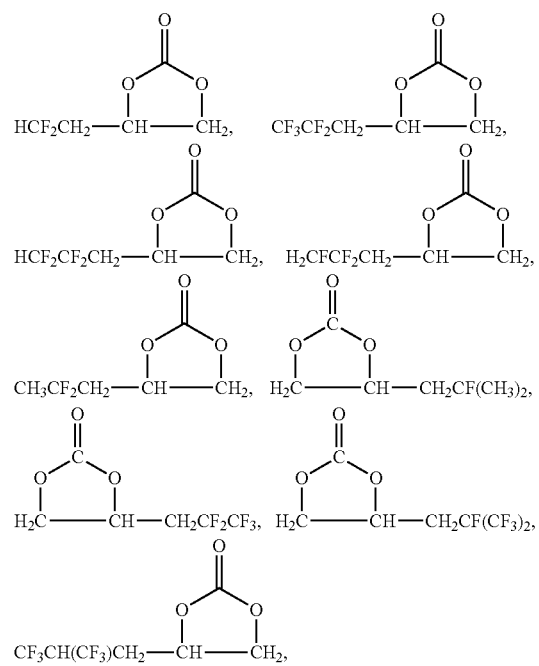

-continued

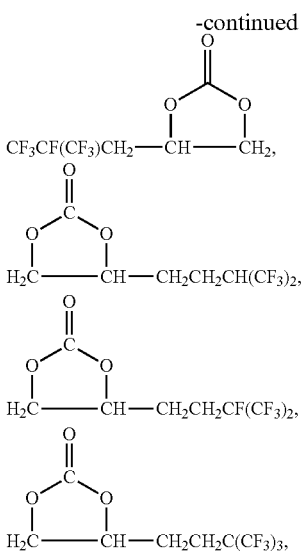

Here, the compounds represented by the formula (1) exclude the following compounds in which all of $R^1$, $R^2$, and $R^3$ are hydrogen atoms or fluorine atoms.

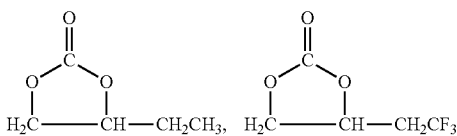

The compounds represented by the formula (1) are preferably the following compounds from the viewpoint of better electrical characteristics.

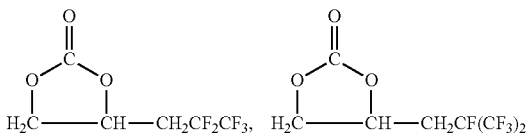

The amount of the compound represented by the formula (1) is 10 vol % or more based on 100 vol % of the nonaqueous solvent.

The amount of the compound represented by the formula (1) being 10 vol % or more based on 100 vol % of the nonaqueous solvent contributes to production of an electrolytic solution that has excellent cell characteristics such as high-temperature storage characteristics, discharge capacity retention factor, and load characteristics.

The amount of the compound represented by the formula (1) is preferably 15 vol % or more based on 100 vol % of the nonaqueous solvent, while it is preferably 90 vol % or less, and more preferably 85 vol % or less. The amount in this range is likely to enable the nonaqueous electrolytic cell to achieve a sufficient effect of improving the cycle characteristics, and is likely to avoid a decrease in the discharge capacity retention factor due to a decrease in the load characteristics caused by an increased resistance, a decrease in the high-temperature storage characteristics, and an increase in the amount of gas generated.

The electrolytic solution of the present invention further contains a nonaqueous solvent and an electrolyte salt.

Examples of the nonaqueous solvent include saturated cyclic carbonates, linear carbonates, cyclic and linear carboxylates, ether compounds, and sulfone-based compounds.

(Saturated Cyclic Carbonates)

Examples of the saturated cyclic carbonates include those having a $C_2$-$C_4$ alkylene group. Specific examples thereof include ethylene carbonate, propylene carbonate, and butylene carbonate. Particularly preferred among these are ethylene carbonate and propylene carbonate from the viewpoint of an increase in the cell characteristics attributed to an increase in the degree of dissociation of lithium ions.

These saturated cyclic carbonates may be combined in any proportion.

The amount of the saturated cyclic carbonate is not particularly limited if the effects of the present invention are not significantly deteriorated. Still, the lower limit for the amount in the case of using one of the saturated cyclic carbonates alone is preferably 5 vol % or more, and more preferably 10 vol % or more based on 100 vol % of the nonaqueous solvent. The amount in this range is likely to avoid a decrease in the electric conductivity due to a decrease in the dielectric constant of the nonaqueous electrolytic solution, bringing the large current discharging characteristics, the stability on the negative electrode, and the cycle characteristics of the nonaqueous electrolytic cell into the respective favorable ranges. The upper limit for the amount is preferably 95 vol % or less, more preferably 90 vol % or less, and still more preferably 85 vol % or less. The amount in this range is likely to bring the viscosity of the nonaqueous electrolytic solution into the proper range and suppress a decrease in the ion conductivity, thereby bringing the cell characteristics such as the load characteristics into the favorable ranges.

Fluorinated cyclic carbonates are also suitable. The fluorinated cyclic carbonates herein are cyclic carbonate compounds that are different from the compounds represented by the above formula (1), and do not include compounds represented by the formula (1).

Examples of the fluorinated cyclic carbonates include a fluorinated cyclic carbonate (A) represented by the following formula (A).

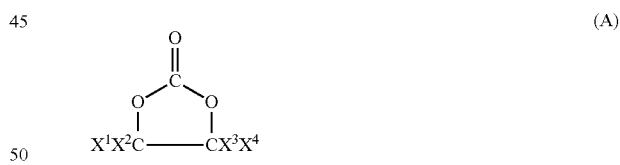

(A)

In the formula, $X^1$ to $X^4$ are the same as or different from one another, each representing —H, —F, a fluorinated alkyl group optionally having an ether bond, or a fluorinated alkoxy group optionally having an ether bond, where at least one of $X^1$ to $X^4$ is —F, a fluorinated alkyl group optionally having an ether group, or a fluorinated alkoxy group optionally having an ether bond.

The electrolytic solution of the present invention containing the fluorinated cyclic carbonate (A), when applied to a product such as a lithium cell, can form a stable film on the negative electrode, and can sufficiently suppress a secondary reaction of the electrolytic solution on the negative electrode. As a result, significantly stable, excellent charge and discharge characteristics can be achieved.

The "ether bond" herein refers to a bond represented by —O—.

In the above formula (A), for expectations of a decrease in the viscosity at low temperatures, an increase in the flash point, and an increase in the solubility for the electrolyte salt, the $X^1$ to $X^4$ are each preferably —H, —F, a fluorinated alkyl group (a), a fluorinated alkyl group (b) having an ether bond, or a fluorinated alkoxy group (c).

In the above formula (A), for expectations of a decrease in the viscosity at low temperatures, an increase in the ignition point, and an increase in the solubility for the electrolyte salt, the $X^1$ to $X^4$ are each preferably —H, —F, a fluorinated alkyl group (a), a fluorinated alkyl group (b) having an ether bond, or a fluorinated alkoxy group (c).

From the viewpoints of good dielectric constant and good oxidation resistance, at least one or two of $X^1$ to $X^4$ is/are preferably —F, a fluorinated alkyl group optionally having an ether bond, or a fluorinated alkoxy group optionally having an ether bond.

The fluorinated alkyl group (a) is obtained by substituting at least one hydrogen atom of an alkyl group with a fluorine atom. The number of carbon atoms of the fluorinated alkyl group (a) is preferably 1 to 20, more preferably 2 to 17, and still more preferably 2 to 7, particularly preferably 2 to 5.

An excessively large number of carbon atoms may decrease the low-temperature characteristics or decrease the solubility for the electrolyte salt, while an excessively small number of carbon atoms may decrease the solubility for the electrolyte salt, decrease the discharge efficiency, and even increase the viscosity.

Examples of a $C_1$ fluorinated alkyl group (a) among the above fluorinated alkyl groups (a) include $CFH_2$—, $CF_2H$—, and $CF_3$—.

Preferred examples of a $C_2$ or higher fluorinated alkyl group (a) among the above fluorinated alkyl groups (a), from the viewpoint of favorable solubility for the electrolyte salt, include fluorinated alkyl groups represented by the following formula (a-1).

$$R^1\text{—}R^2\text{—} \qquad (a\text{-}1)$$

In the formula, $R^1$ represents a $C_1$ or higher alkyl group optionally containing a fluorine atom; and $R^2$ represents a $C_1$-$C_3$ alkylene group optionally containing a fluorine atom, where at least one of $R^1$ and $R^2$ contains a fluorine atom.

Here, $R^1$ and $R^2$ may each further contain an atom other than carbon atoms, hydrogen atoms, and fluorine atoms.

$R^1$ is a $C_1$ or higher alkyl group optionally containing a fluorine atom. $R^1$ is preferably a $C_1$-$C_{16}$ linear or branched alkyl group. The number of carbon atoms of $R^1$ is more preferably 1 to 6, and still more preferably 1 to 3.

Specifically, for $R^1$, linear or branched alkyl groups such as $CH_3$—, $CH_3CH_2$—, $CH_3CH_2CH_2$—, $CH_3CH_2CH_2CH_2$—,

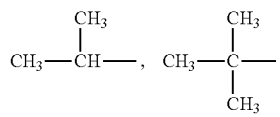

can be mentioned.

In the case that $R^1$ is a linear alkyl group containing a fluorine atom, examples of $R^1$ include $CF_3$—, $CF_3CH_2$—, $CF_3CF_2$—, $CF_3CH_2CH_2$—, $CF_3CF_2CH_2$—, $CF_3CF_2CF_2$—, $CF_3CH_2CF_2$—, $CF_3CH_2CH_2CH_2$—, $CF_3CF_2CH_2CH_2$—, $CF_3CH_2CF_2CH_2$—, $CF_3CF_2CF_2CH_2$—, $CF_3CF_2CF_2CH_2$—, $CF_3CF_2CF_2CF_2$—, $CF_3CF_2CH_2CF_2$—, $CF_3CH_2CH_2CH_2CH_2$—, $CF_3CF_2CH_2CH_2CH_2$—, $CF_3CH_2CF_2CH_2CH_2$—, $CF_3CF_2CF_2CH_2CH_2$—, $CF_3CF_2CF_2CF_2CH_2$—, $CF_3CF_2CH_2CF_2CH_2$—, $CF_3CF_2CF_2CF_2CH_2CH_2$—, $CF_3CF_2CH_2CH_2CH_2CH_2$—, $CF_3CF_2CH_2CF_2CH_2CH_2$—, $HCF_2$—, $HCF_2CH_2$—, $HCF_2CF_2$—, $HCF_2CH_2CH_2$—, $HCF_2CF_2CH_2$—, $HCF_2CH_2CF_2$—, $HCF_2CF_2CH_2CH_2$—, $HCF_2CH_2CF_2CH_2$—, $HCF_2CF_2CF_2CF_2$—, $HCF_2CF_2CH_2CH_2CH_2$—, $HCF_2CH_2CF_2CH_2CH_2$—, $HCF_2CF_2CF_2CF_2CH_2$—, $HCF_2CF_2CF_2CF_2CH_2CH_2$—, $FCH_2$—, $FCH_2CH_2$—, $FCH_2CF_2$—, $FCH_2CF_2CH_2$—, $FCH_2CF_2CF_2$—, $CH_3CF_2CH_2$—, $CH_3CF_2CF_2$—, $CH_3CH_2CH_2$—, $CH_3CF_2CH_2CF_2$—, $CH_3CF_2CF_2CF_2$—, $CH_3CH_2CF_2CF_2$—, $CH_3CH_2CH_2CH_2$—, $CH_3CH_2CH_2CH_2$—, $CH_3CF_2CF_2CF_2CH_2$—, $CH_3CF_2CF_2CH_2CH_2$—, $CH_3CH_2CF_2CF_2CH_2$—, $CH_3CF_2CH_2CF_2CH_2$—, $CH_3CF_2CH_2CF_2CH_2CH_2$—, $CH_3CF_2CH_2CF_2CH_2CH_2$—, $HCFClCF_2CH_2$—, $HCF_2CFClCH_2$—, $HCF_2CFClCF_2CFClCH_2$—, and $HCFClCF_2CFClCF_2CH_2$—.

In the case that $R^1$ is a branched alkyl group containing a fluorine atom,

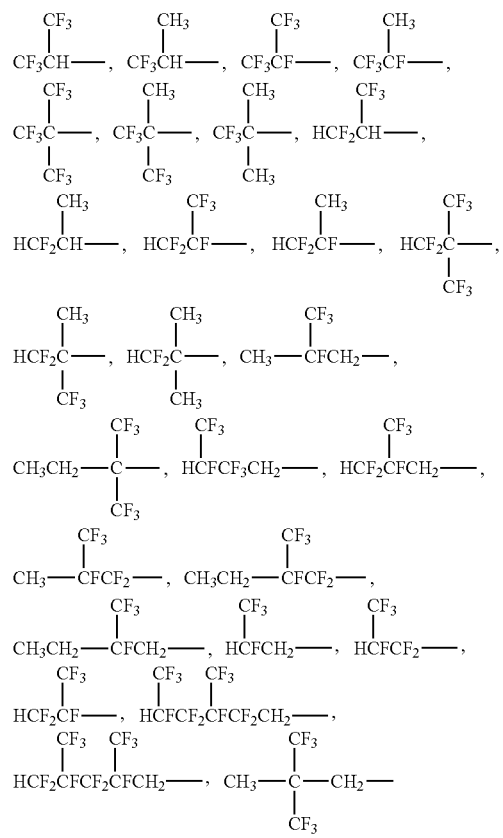

can be mentioned as preferred examples. Here, branched moieties such as —$CH_3$ and —$CF_3$ are likely to increase the viscosity, and thus the number of these groups is more preferably small (i.e. one) or zero.

$R^2$ is a $C_1$-$C_3$ alkylene group optionally containing a fluorine atom. $R^2$ may be linear or branched. Examples of the minimum structural units constituting such a linear or branched alkylene group are listed below. $R^2$ is formed from one of or a combination of these units.

(i) Minimum Structural Units for a Linear Alkylene Group
—$CH_2$—, —$CHF$—, —$CF_2$—, —$CHCl$—, —$CFCl$—, —$CCl_2$—

(ii) Minimum Structural Units for a Branched Alkylene Group

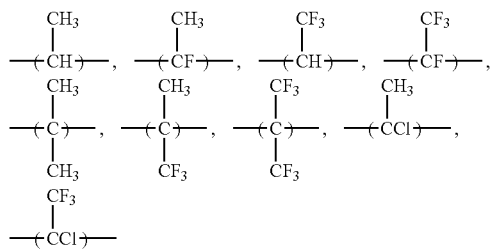

Here, units free from Cl are preferred among these because such units cause no dehydrochlorination reaction due to the base, and are more stable.

$R^2$, in the case of having a linear structure, is formed only from the above minimum structural units for linear structures, preferably —$CH_2$—, —$CH_2CH_2$—, or $CF_2$—. From the viewpoint of further increasing the solubility for the electrolyte salt, —$CH_2$— or —$CH_2CH_2$— is more preferred.

$R^2$, in the case of having a branched structure, includes at least one of the above minimum structural units for branched structures, preferably a unit represented by a formula: —($CX^aX^b$)— (wherein $X^a$ is H, F, $CH_3$, or $CF_3$; $X^b$ is $CH_3$ or $CF_3$, where $X^a$ is H or $CH_3$ when $X^b$ is $CF_3$). These units can further increase, in particular, the solubility for the electrolyte salt.

For the fluorinated alkyl group (a), $CF_3CF_2$—, $HCF_2CF_2$—, $H_2CFCF_2$—, $CH_3CF_2$—, $CF_3CF_2CF_2$—, $HCF_2CF_2CF_2$—, $H_2CFCF_2CF_2$—, $CH_3CF_2CF_2$—,

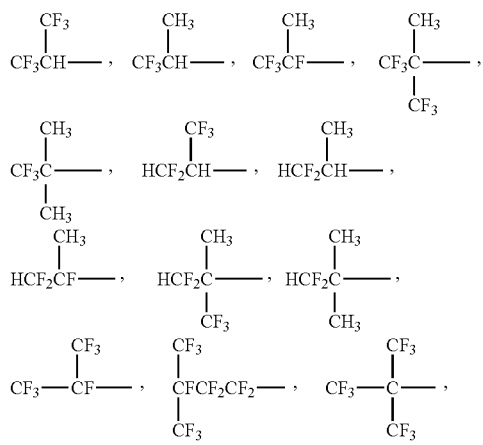

are preferred, for example.

The fluorinated alkyl group (b) having an ether bond is obtained by substituting, with a fluorine atom, at least one hydrogen atom of the alkyl group having an ether bond. The fluorinated alkyl group (b) having an ether bond is preferably a $C_2$-$C_{17}$ fluorinated alkyl group. An excessively large number of carbon atoms increases the viscosity of the fluorinated cyclic carbonate (A) and increases the number of fluorine-containing groups, possibly causing a decrease in the solubility for the electrolyte salts due to a decrease in the dielectric constant, and also a decrease in the compatibility with the other solvents. In this respect, the number of carbon atoms of the fluorinated alkyl group (b) having an ether bond is more preferably 2 to 10, and still more preferably 2 to 7.

The alkylene group constituting the ether moiety of the fluorinated alkyl group (b) having an ether bond may be a linear or branched alkylene group. Examples of the minimum structural units constituting such a linear or branched alkylene group are listed below.

(i) Minimum Structural Units for a Linear Alkylene Group
—$CH_2$—, —CHF—, —$CF_2$—, —CHCl—, —CFCl—, —$CCl_2$—

(ii) Minimum Structural Units for a Branched Alkylene Group

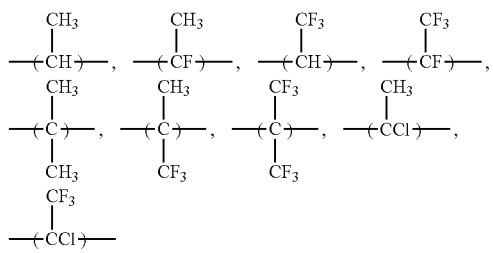

The alkylene group may be formed only from these minimum structural units, or may be formed from a combination of linear units (i), a combination of branched units (ii), or a combination of linear units (i) and branched units (ii). Specific preferred examples thereof are described later.

Here, units free from Cl are preferred among these because such units cause no dehydrochlorination reaction due to the base, and are more stable.

More preferred examples of the fluorinated alkyl group (b) having an ether bond include those represented by the formula (b-1):

$$R^3—(OR^4)_{n1}— \quad (b\text{-}1)$$

wherein $R^3$ is preferably a $C_1$-$C_6$ alkyl group which optionally contains a fluorine atom; $R^4$ is preferably a $C_1$-$C_4$ alkylene group which optionally contains a fluorine atom; and n1 is an integer of 1 to 3, where at least one of $R^3$ and $R^4$ contains a fluorine atom.

Examples of $R^3$ and $R^4$ include, but not limited to, the following compounds, and any appropriate combination of the compounds may constitute the fluorinated alkyl group (b) having an ether bond which is represented by the above formula (b-1).

(1) $R^3$ is preferably an alkyl group represented by a formula:
$X^c_3C—(R^5)_{n2}$—, wherein the three $X^c$s are the same as or different from one another, each representing H or F; $R^5$ is a $C_1$-$C_5$ alkylene group optionally containing a fluorine atom; and n2 is 0 or 1.

If n2 is 0, examples of $R^3$ include $CH_3$—, $CF_3$—, $HCF_2$—, and $H_2CF$—.

If n2 is 1, specific examples of $R^3$ with a linear structure include the following compounds: $CF_3CH_2$—, $CF_3CF_2$—, $CF_3CH_2CH_2$—, $CF_3CF_2CH_2$—, $CF_3CF_2CF_2$—, $CF_3CH_2CF_2$—, $CF_3CH_2CH_2CH_2$—, $CF_3CF_2CH_2CH_2$—, $CF_3CH_2CF_2CH_2$—, $CF_3CF_2CF_2CH_2$—, $CF_3CF_2CF_2CF_2$—, $CF_3CF_2CH_2CF_2$—, $CF_3CH_2CH_2CH_2CH_2$—, $CF_3CF_2CH_2CH_2CH_2$—, $CF_3CH_2CF_2CH_2CH_2$—, $CF_3CF_2CF_2CH_2CH_2$—, $CF_3CF_2CF_2CF_2CH_2$—, $CF_3CF_2CH_2CH_2CH_2$—, $CF_3CH_2CH_2CH_2CH_2$—, $CF_3CF_2CF_2CF_2CH_2CH_2$—, $CF_3CF_2CH_2CH_2CH_2CH_2$—, $HCF_2CH_2$—, $HCF_2CF_2$—, $HCF_2CH_2CH_2$—, $HCF_2CF_2CH_2$—, $HCF_2CH_2CF_2$—, $HCF_2CF_2CH_2CH_2$—, HCF₂CH₂CF₂CH₂—, HCF₂CF₂CF₂CF₂—, HCF₂CF₂CH₂CH₂CH₂—, HCF₂CH₂CF₂CH₂CH₂—, HCF₂CF₂CF₂CF₂CH₂—, HCF₂CF₂CF₂CH₂CH₂—, FCH₂CH₂—, FCH₂CF₂—, FCH₂CF₂CH₂—, FCH₂CF₂CH₂—, CH₃CF₂—, CH₃CH₂—, CH₃CF₂CH₂—, CH₃CF₂CF₂—, CH₃CH₂CH₂—, CH₃CF₂CH₂CF₂—, CH₃CF₂CF₂CF₂—, CH₃CH₂CF₂CF₂—, CH₃CH₂CH₂CH₂—, CH₃CF₂CH₂CF₂CH₂—, CH₃CF₂CF₂CF₂CH₂—, CH₃CF₂CH₂CF₂CH₂—, CH₃CH₂CF₂CF₂CH₂—, CH₃CF₂CH₂CF₂CH₂—, CH₃CF₂CH₂CF₂CH₂CH₂—, CH₃CH₂CF₂CF₂CH₂CH₂—, and CH₃CF₂CH₂CF₂CH₂CH₂—.

For R³ with a branched structure in the case that n2 is 1,

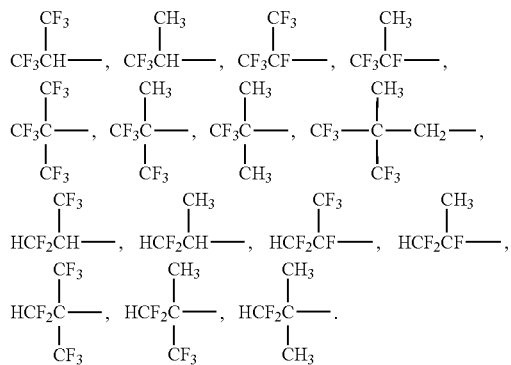

can be mentioned as examples.

Here, branched moieties such as —CH₃ and —CF₃ are likely to increase the viscosity, and thus R³ is more preferably one with a linear structure.

(2) In —(OR⁴)$_{n1}$— of the above formula (b-1), n1 is an integer of 1 to 3, and preferably 1 or 2. Here, in the case that n1=2 or 3, R⁴s may be the same as or different from one another.

Specific preferred examples of R⁴ include the following compounds with linear or branched structures.

Examples of the linear structure include —CH₂—, —CHF—, —CF₂—, —CH₂CH₂—, —CF₂CH₂—, —CF₂CF₂—, —CH₂CF₂—, —CH₂CH₂CH₂—, —CH₂CH₂CF₂—, —CH₂CF₂CH₂—, —CH₂CF₂CF₂—, —CF₂CH₂CH₂—, —CF₂CF₂CH₂—, —CF₂CH₂CF₂—, and —CF₂CF₂CF₂—.

For the branched structure,

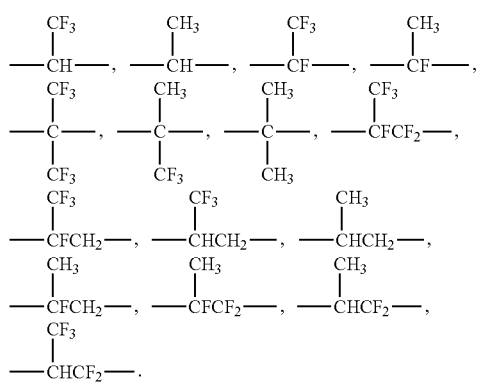

can be mentioned as examples.

The above fluorinated alkoxy group (c) is obtained by substituting at least one hydrogen atom of an alkoxy group with a fluorine atom. The fluorinated alkoxy group (c) is preferably a $C_1$-$C_{17}$, more preferably $C_1$-$C_6$ alkoxy group.

Particularly preferred for the fluorinated alkoxy group (c) is a fluorinated alkoxy group represented by a formula: $X^d_3C$—$(R^6)_{n3}$—O—, wherein the three $X^d$s are the same as or different from one another, each representing H or F; $R^6$ is preferably a $C_1$-$C_5$ alkylene group optionally containing a fluorine atom; and n3 is 0 or 1, where any of the three $X^d$s is a fluorine atom.

Specific examples of the fluorinated alkoxy group (c) include fluorinated alkoxy groups in which an oxygen atom is bonded to a terminal of an alkyl group shown as an example of R¹ in the above formula (a-1).

Each of the fluorinated alkyl group (a), the fluorinated alkyl group (b) having an ether bond, and the fluorinated alkoxy group (c) of the fluorinated cyclic carbonate (A) has a fluorine content of 10% by mass or higher. An excessively low fluorine content may not sufficiently achieve the effects of decreasing the viscosity at low temperatures and increasing the flash point. From these viewpoints, the fluorine content is more preferably 12% by mass or higher, and still more preferably 15% by mass or higher. The upper limit therefor is typically 76% by mass. Here, the fluorine content of each of the fluorinated alkyl group (a), the fluorinated alkyl group (b) having an ether bond, and the fluorinated alkoxy group (c) is a value calculated from the formula {(number of fluorine atoms×19)/formula weight of each group}×100(%) based on the structural formula of the group.

From the viewpoints of good dielectric constant and good oxidation resistance, the fluorine content of the whole fluorinated cyclic carbonate (A) is preferably 10% by mass or higher, and more preferably 15% by mass or higher. The upper limit therefor is typically 76% by mass. Here, the fluorine content of the fluorinated cyclic carbonate (A) is a value calculated from the formula {(number of fluorine atoms×19)/molecular weight of fluorinated cyclic carbonate (A)}×100(%) based on the structural formula of the fluorinated cyclic carbonate (A).

For the fluorinated cyclic carbonate (A),

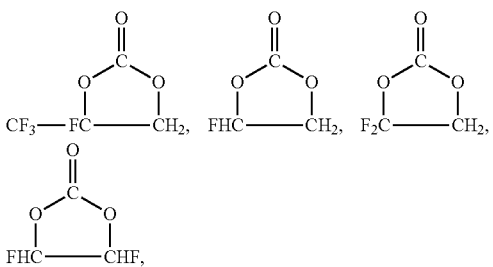

can be mentioned as specific examples.
As the others examples,

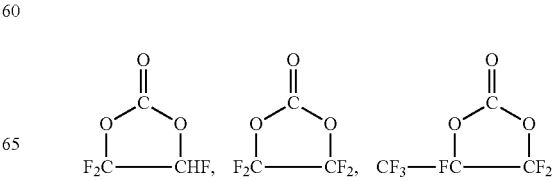

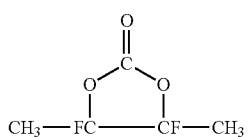

can be mentioned.

For a fluorinated saturated cyclic carbonate (A) which is the fluorinated carbonate (A) wherein at least one of $X^1$ to $X^4$ is a fluorinated alkyl group (a), and the rest of $X^1$ to $X^4$ is —H (here, the fluorinated saturated cyclic carbonate (A) is a cyclic carbonate compound that is different from the compounds represented by the above formula (1) and does not include the compounds represented by the formula (1)),

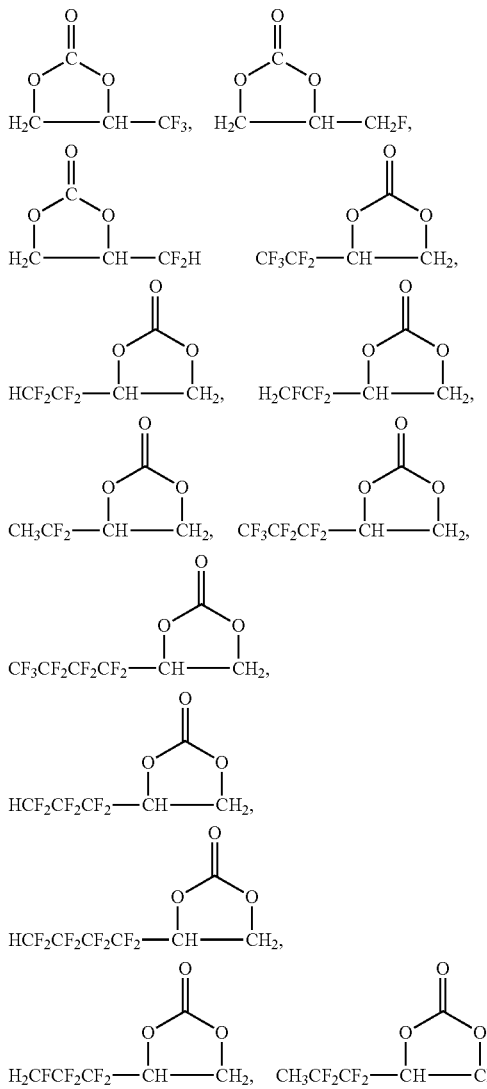

are specifically mentioned.

For the fluorinated cyclic carbonate (A) represented by the above formula (A) wherein at least one of $X^1$ to $X^4$ is a fluorinated alkyl group (b) having an ether bond or a fluorinated alkoxy group (c) and the rest of $X^1$ to $X^4$ is —H,

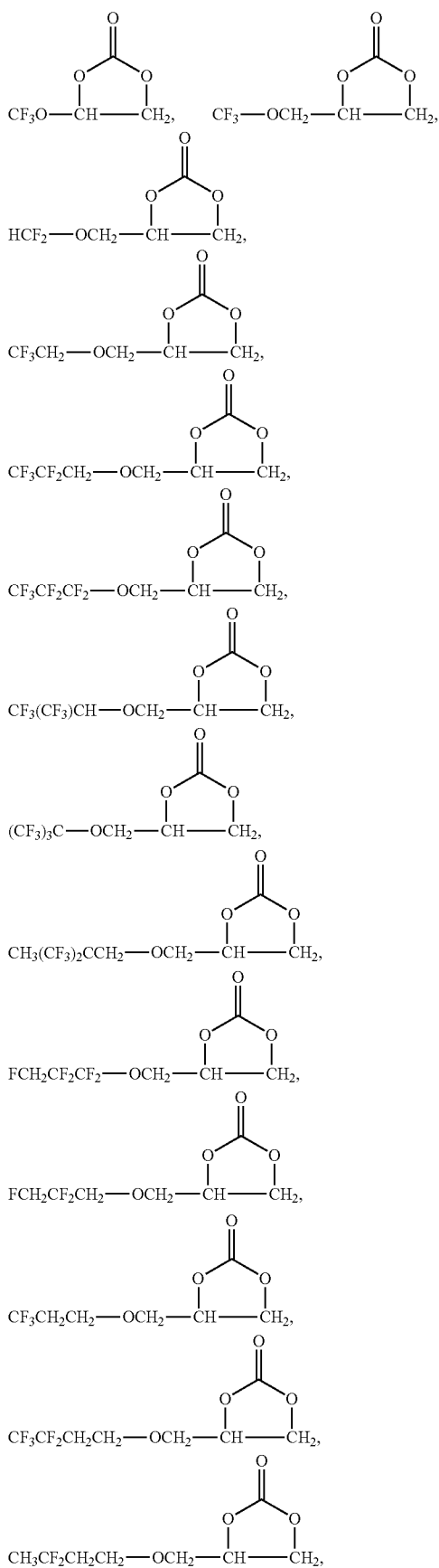

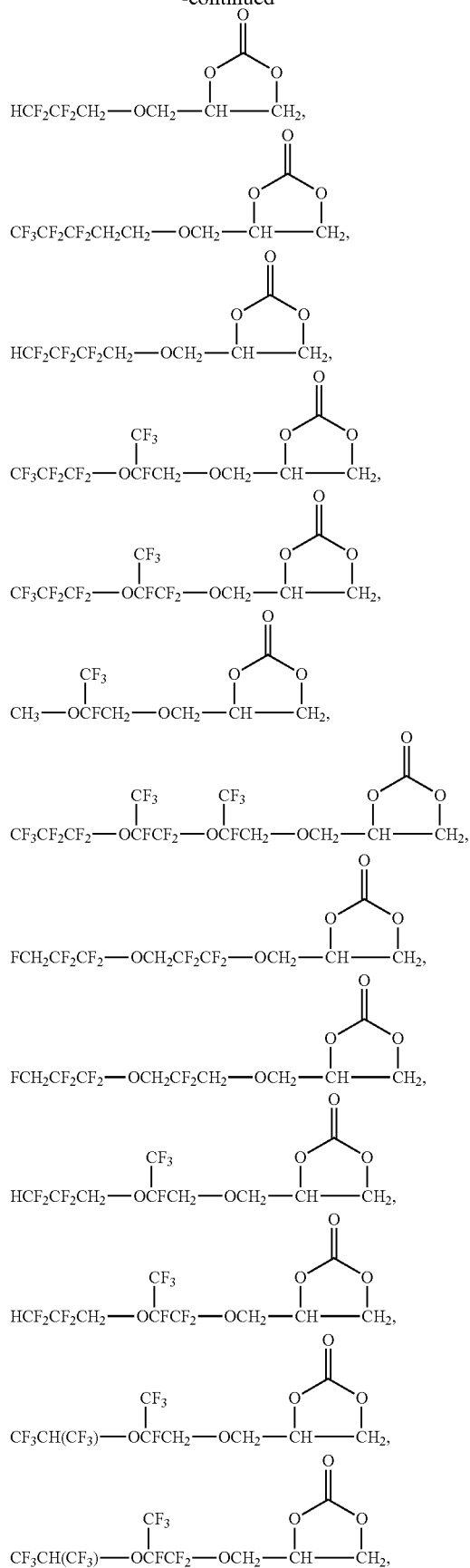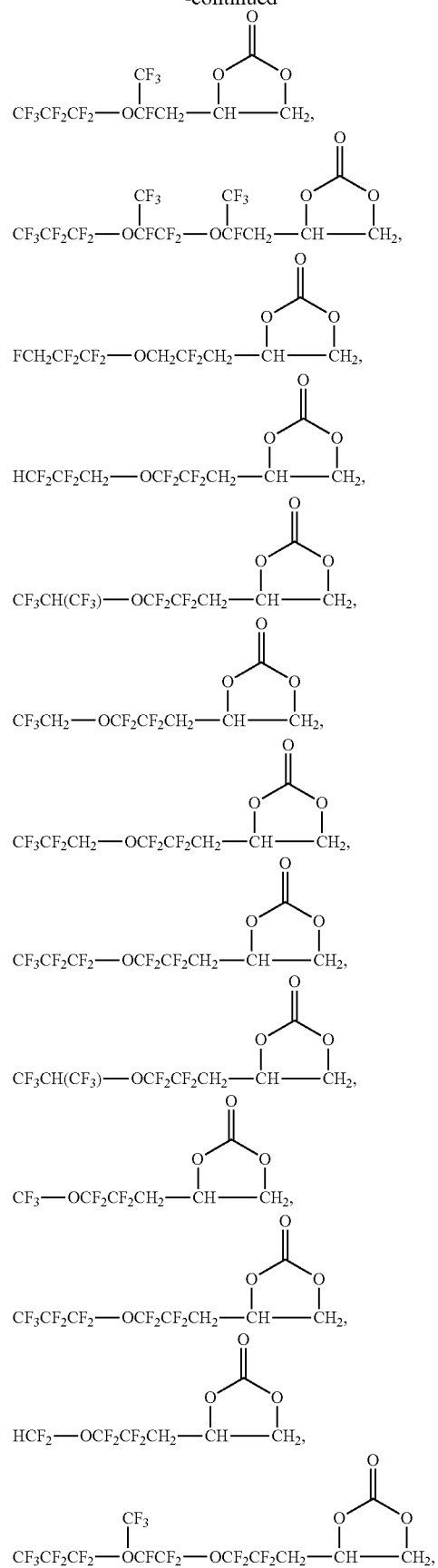

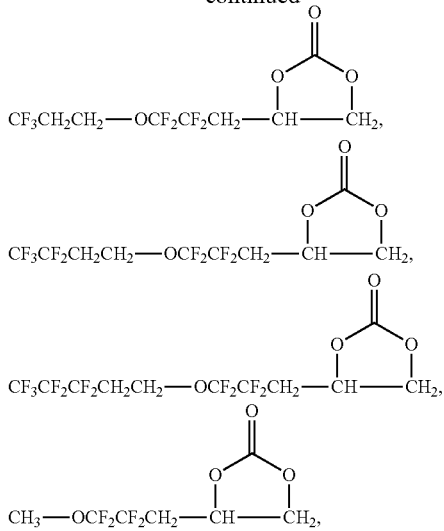

can be mentioned as specific examples.

The fluorinated cyclic carbonate (A) is not limited to the specific examples described above.

The above examples of the fluorinated cyclic carbonate (A) may be used alone or in any combination in any proportion. The amount of the fluorinated cyclic carbonate may be any value that does not significantly deteriorate the effects of the present invention, but the amount is preferably 0.01 vol % or more, more preferably 0.1 vol % or more, and still more preferably 0.2 vol % or more based on 100 vol % of the nonaqueous solvent. The amount is more preferably 95 vol % or less, and more preferably 90 vol % or less. If the amount is in this range, the nonaqueous electrolytic cell is likely to achieve a sufficient effect of improving the cycle characteristics, and to avoid a decrease in the discharge capacity retention factor due to a decrease in the high-temperature storage characteristics and a decrease in the amount of generated gas.

(Linear Carbonate)

The linear carbonate is preferably a $C_3$-$C_7$ linear carbonate.

Specific examples of the $C_3$-$C_7$ linear carbonate include dimethyl carbonate (DMC), diethyl carbonate (DEC), di-n-propyl carbonate, diisopropyl carbonate, n-propyl isopropyl carbonate, ethyl methyl carbonate (EMC), methyl-n-propyl carbonate, n-butyl methyl carbonate, isobutyl methyl carbonate, t-butyl methyl carbonate, ethyl-n-propyl carbonate, n-butyl ethyl carbonate, isobutyl ethyl carbonate, and t-butyl ethyl carbonate.

Preferred among these are dimethyl carbonate (DMC), diethyl carbonate (DEC), di-n-propyl carbonate, diisopropyl carbonate, n-propyl isopropyl carbonate, ethyl methyl carbonate (EMC), and methyl-n-propyl carbonate. Particularly preferred are dimethyl carbonate (DMC), diethyl carbonate (DEC), and ethyl methyl carbonate (EMC).

For the linear carbonate, a fluorinated linear carbonate is suitable as well. The number of fluorine atoms of the fluorinated linear carbonate is not particularly limited, but is typically 6 or less, and preferably 4 or less. If the fluorinated linear carbonate contains multiple fluorine atoms, the fluorine atoms may be bonded to the same carbon atom, or may be bonded to different carbon atoms. Examples of the fluorinated linear carbonate include fluorinated dimethyl carbonate derivatives, fluorinated ethyl methyl carbonate derivatives, and fluorinated diethyl carbonate derivatives.

Examples of the fluorinated dimethyl carbonate derivatives include fluoromethyl methyl carbonate, difluoromethyl methyl carbonate, trifluoromethyl methyl carbonate, bis(fluoromethyl)carbonate, bis(difluoro)methyl carbonate, and bis(trifluoromethyl)carbonate.

Examples of the fluorinated ethyl methyl carbonate derivatives include 2-fluoroethyl methyl carbonate, ethyl-fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, and ethyl trifluoromethyl carbonate.

Examples of the fluorinated diethyl carbonate derivatives include ethyl-(2-fluoroethyl) carbonate, ethyl-(2,2-difluoroethyl) carbonate, bis(2-fluoroethyl) carbonate, ethyl-(2,2,2-trifluoroethyl) carbonate, 2,2-difluoroethyl-2'-fluoroethyl carbonate, bis(2,2-difluoroethyl) carbonate, 2,2,2-trifluoroethyl-2',2'-difluoroethyl carbonate, and bis(2,2,2-trifluoroethyl) carbonate.

Especially from the viewpoint of better electrical characteristics, the following compounds are preferred. $CF_3CH_2OCOOCH_2CF_3$, $CF_3CF_2CH_2OCOOCH_2CF_2CF_3$, $CF_3CF_2CH_2OCOOCH_3$, $CF_3CH_2OCOOCH_3$, $CF_3CF_2CH_2OCOOCH_3$, $HCF_2CF_2CH_2OCOOCH_3$, $CF_3OCOOCH_3$, $HCF_2CF_2CH_2OCOOC_2H_5$, $HCF_2CF_2CH_2OCOOC_2H_5$ The linear carbonate and the fluorinated linear carbonate may be used alone or in any combination in any proportion.

The amount of the linear carbonate based on 100 vol % of the nonaqueous solvent is preferably 5 vol % or more, more preferably 10 vol % or more, and still more preferably 15 vol % or more. The amount in this range is likely to bring the viscosity of the nonaqueous electrolytic solution into an appropriate range, suppress a decrease in the ion conductivity, and bring the large current discharging characteristics of the nonaqueous electrolytic cell into the favorable range. Also, the amount of the linear carbonate based on 100 vol % of the nonaqueous solvent is preferably 90 vol % or less, and more preferably 85 vol % or less. The amount in this range is likely to avoid a decrease in the electric conductivity due to a decrease in the dielectric constant of the nonaqueous electrolytic solution, and bring the large current discharging characteristics of the nonaqueous electrolytic cell into the favorable range.

Combining a specific amount of ethylene carbonate with a specific linear carbonate significantly increases the cell characteristics. For example, if DMC, EMC, or DEC is selected as the specific linear carbonate, the amount of the ethylene carbonate is preferably from 10 vol % to 80 vol % inclusive, and the amount of DMC, EMC, or DEC is preferably from 20 vol % to 90 vol % inclusive. Such amounts make it possible to decrease the viscosity of the nonaqueous electrolytic solution to increase the ion conductivity while decreasing the low-temperature deposit temperature of the electrolyte, so that high power can be obtained even at low temperatures.

It is also preferred to use specific linear carbonates in combination. If DMC and EMC are used in combination as the specific linear carbonates, it is particularly preferred that the amount of ethylene carbonate be from 10 vol % to 60 vol % inclusive, the amount of DMC be from 10 vol % to 70 vol % inclusive, and the amount of EMC be from 10 vol % to 80 vol % inclusive. If DMC and DEC are used in combination as the specific linear carbonates, it is particularly preferred that the amount of ethylene carbonate be from 10 vol % to 60 vol % inclusive, the amount of DMC be from 10 vol % to 70 vol % inclusive, and the amount of DEC be from 10 vol % to 70 vol % inclusive. If EMC and DEC are used in combination as the specific linear carbonates, it is particularly preferred that the amount of ethylene carbonate be from 10 vol % to 60 vol % inclusive, the amount of EMC be from 10 vol % to 80 vol % inclusive, and the amount of DEC be from 10 vol % to 70 vol % inclusive.

(Cyclic Carboxylate)

Examples of the cyclic carboxylate include those having a structural formula with a total number of carbon atoms of 3 to 12. Specific examples thereof include γ-butyrolactone, γ-valerolactone, γ-caprolactone, and ε-caprolactone. Particularly preferred among these is γ-butyrolactone from the viewpoint of an increase in the cell characteristics attributed to an increase in the degree of dissociation of lithium ions.

The amount of the cyclic carboxylate based on 100 vol % of the nonaqueous solvent is typically preferably 5 vol % or more, and more preferably 10 vol % or more. The amount in this range is likely to improve the electric conductivity of the nonaqueous electrolytic solution, and improve the large current discharging characteristics of the nonaqueous electrolytic solution. The amount of the cyclic carboxylate is preferably 50 vol % or less, and more preferably 40 vol % or less. Setting the upper limit as described above is likely to bring the viscosity of the nonaqueous electrolytic solution in an appropriate range, avoid a decrease in the electric conductivity, suppress an increase in the negative electrode resistance, and bring the large current discharging characteristics of the nonaqueous electrolytic cell into a favorable range.

Also, fluorinated cyclic carboxylates (fluorine-containing lactones) are suitable. Examples of the fluorine-containing lactones include fluorine-containing lactones represented by the following formula (C):

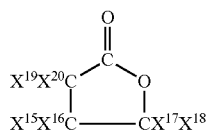

(C)

wherein $X^{15}$ to $X^{20}$ are the same as or different from one another, each representing —H, —F, —Cl, —CH$_3$, or a fluorinated alkyl group, where at least one of $X^{15}$ to $X^{20}$ is a fluorinated alkyl group.

Preferred examples of the fluorinated alkyl group in $X^{15}$ to $X^{20}$ include —CFH$_2$, —CF$_2$H, —CF$_3$, —CH$_2$CF$_3$, —CF$_2$CF$_3$, —CH$_2$CF$_2$CF$_3$, and —CF(CF$_3$)$_2$. From the viewpoints of high oxidation resistance and the safety improvement effect, —CH$_2$CF$_3$ and —CH$_2$CF$_2$CF$_3$ are preferred.

If at least one of $X^{15}$ to $X^{20}$ is a fluorinated alkyl group, $X^{15}$ to $X^{20}$ may be substituted with —H, —F, —Cl, —CH$_3$, or a fluorinated alkyl group at a single or multiple sites. Preferably, from the viewpoint of good solubility for the electrolyte salt, they are substituted at 1 to 3 sites, more preferably 1 or 2 sites.

The substitution site for the fluorinated alkyl group is not limited, but from the viewpoint of good synthetic yield, $X^{17}$ and/or $X^{18}$, especially $X^{17}$ or $X^{18}$, are/is preferably a fluorinated alkyl group, especially —CH$_2$CF$_3$ or —CH$_2$CF$_2$CF$_3$. $X^{15}$ to $X^{20}$ that are not fluorinated alkyl groups are each —H, —F, —Cl, or CH$_3$, particularly preferably —H, from the viewpoint of good solubility for the electrolyte salt.

Examples of the fluorine-containing lactones include, as well as the ones represented by the above formula, fluorine-containing lactones represented by the following formula (D):

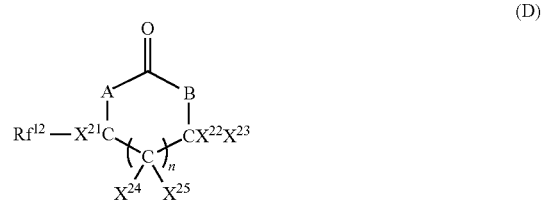

(D)

wherein one of A and B is CX$^{26}$X$^{27}$ (X$^{26}$ and X$^{27}$ are the same as or different from one another, each representing —H, —F, —Cl, —CF$_3$, —CH$_3$, or an alkylene group in which a hydrogen atom may be substituted with a halogen atom, and a hetero atom may be contained in the chain), and the other of A and B is an oxygen atom; Rf$^{12}$ is a fluorinated alkyl group or fluorinated alkoxy group optionally having an ether bond; X$^{21}$ and X$^{22}$ are the same as or different from one another, each representing —H, —F, —Cl, —CF$_3$, or CH$_3$; X$^{23}$ to X$^{25}$ are the same as or different from one another, each representing —H, —F, —Cl, or an alkyl group in which a hydrogen atom may be substituted with a halogen atom and a hetero atom may be contained in the chain; and n=0 or 1.

From the viewpoints of easy synthesis and good chemical stability, preferred examples of the fluorine-containing lactones represented by the formula (D) include five-membered ring structures represented by the following formula (E):

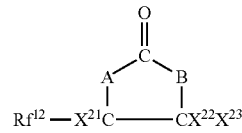

(E)

wherein A, B, Rf$^{12}$, X$^{21}$, X$^{22}$, and X$^{23}$ are the same as those defined in the formula (D). The preferred examples also include those with different combinations of A and B, namely fluorine-containing lactones represented by the following formula (F):

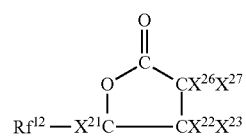

(F)

wherein Rf$^{12}$, X$^{21}$, X$^{22}$, X$^{23}$, X$^{26}$, and X$^{27}$ are the same as those defined in the formula (D), and fluorine-containing lactones represented by the following formula (G):

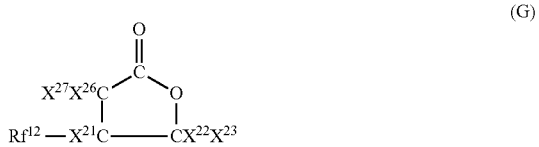

wherein $Rf^{12}$, $X^{21}$, $X^{22}$, $X^{23}$, $X^{26}$, and $X^{27}$ are the same as those defined in the formula (D).

In particular, the following compounds are listed from the viewpoint of improving the characteristics as the electrolytic solution in the present invention by achieving excellent characteristics such as a high dielectric constant and a high withstand voltage, and achieving favorable solubility for the electrolyte salt and favorable reduction in the internal resistance.

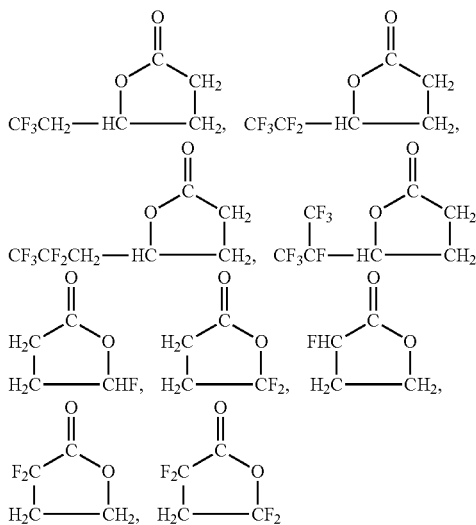

Adding a fluorinated cyclic carboxylate improves the ion conductivity, the safety, and the stability at high temperatures.

(Linear Carboxylate)

Examples of the linear carboxylates include those having a structural formula with a total number of carbon atoms of 3 to 7. Specific examples thereof include methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, t-butyl propionate, methyl butyrate, ethyl butyrate, n-propyl butyrate, n-propyl butyrate, isopropyl butyrate, methyl isobutyrate, ethyl isobutyrate, n-propyl isobutyrate, and isopropyl isobutyrate.

From the viewpoint of improving the ion conductivity due to a decrease in the viscosity, methyl acetate, ethyl acetate, n-propyl acetate, n-butyl acetate, methyl propionate, ethyl propionate, n-propyl propionate, isopropyl propionate, methyl butyrate, and ethyl butyrate are preferred.

The typical amount of the linear carboxylate based on 100 vol % of the nonaqueous solvent is preferably 10 vol % or more, and more preferably 15 vol % or more. Such a lower limit is likely to improve the electric conductivity of the electrolytic solution, and also improve the large current discharging characteristics of the nonaqueous electrolytic cell. The amount of the linear carboxylate based on 100 vol % of the nonaqueous solvent is preferably 60 vol % or less, and more preferably 50 vol % or less. Such an upper limit is likely to suppress an increase in the negative electrode, and bring the large current discharging characteristics and the cycle characteristics of the nonaqueous electrolytic cell into the respective favorable ranges.

Also, a fluorinated linear carboxylate is suitable. The fluorine-containing ester is preferably a fluorinated linear carboxylate represented by the following formula (H):

$$Rf^{10}COORf^{11} \qquad (H)$$

(wherein $Rf^{10}$ is a $C_1$-$C_2$ fluorinated alkyl group, and $Rf^{11}$ is a $C_1$-$C_4$ fluorinated alkyl group) from the viewpoints of high flame retardancy, favorable compatibility with the other solvents and favorable oxidation resistance.

Examples of $Rf^{10}$ include $CF_3$—, $CF_3CF_2$—, $HCF_2CF_2$—, $HCF_2$—, $CH_3CF_2$—, and $CF_3CH_2$—. Particularly preferred among these are $CF_3$— and $CF_3CF_2$— from the viewpoint of favorable rate characteristics.

Examples of $Rf^{11}$ include $CF_3$, —$CF_2CF_3$, —$CH(CF_3)_2$, —$CH_2CF_3$, —$CH_2CH_2CF_3$, —$CH_2CF_2CFHCF_3$, —$CH_2C_2F_5$, —$CH_2CF_2CF_2H$, —$CH_2CH_2C_2F_5$, —$CH_2CF_2CF_3$, and —$CH_2CF_2CF_2CF_3$. Particularly preferred among these are —$CH_2CF_3$, —$CH(CF_3)_2$— $CH_2C_2F_5$, and —$CH_2CF_2CF_2H$ from the viewpoint of favorable compatibility with the other solvents.

Specifically, the fluorinated linear carboxylate is, for example, one or more of $CF_3C(=O)OCH_2CF_3$, $CF_3C(=O)OCH_2CH_2CF_3$, $CF_3C(=O)OCH_2C_2F_5$, $CF_3C(=O)OCH_2CF_2CF_2H$, and $CF_3C(=O)OCH(CF_3)_2$. Particularly preferred among these are $CF_3C(=O)OCH_2C_2F_5$, $CF_3C(=O)OCH_2CF_2CF_2H$, $CF_3C(=O)OCH_2CF_3$, and $CF_3C(=O)OCH(CF_3)_2$ from the viewpoints of favorable compatibility with the other solvents and favorable rate characteristics.

Addition of a fluorinated linear carboxylate is expected to achieve the effect of improving the oxidation resistance.

(Ether Compound)

The ether compound is preferably a $C_3$-$C_{10}$ chain ether or a $C_3$-$C_6$ cyclic ether.

Examples of the $C_3$-$C_{10}$ chain ether include diethyl ether, di-n-butyl ether, dimethoxymethane, methoxyethoxy methane, diethoxy methane, dimethoxy ethane, methoxyethoxy ethane, diethoxy ethane, ethylene glycol di-n-propyl ether, ethylene glycol di-n-butyl ether, and diethylene glycol dimethyl ether.

Also, a fluorinated ether is suitable.

Examples of the fluorinated ether include a fluorinated ether (I) represented by the following formula (I):

$$Rf^1\text{—O—}Rf^2 \qquad (I)$$

wherein $Rf^1$ and $Rf^2$ are the same as or different from one another, each representing a $C_1$-$C_{10}$ alkyl group or a $C_1$-$C_{10}$ fluorinated alkyl group, where at least one of $Rf^1$ and $Rf^2$ is a fluorinated alkyl group. Addition of the fluorinated ether (I) improves the flame retardancy and the stability and safety at high temperatures and high voltages of the electrolytic solution.

In the formula (I), at least one of $Rf^1$ and $Rf^2$ is a $C_1$-$C_{10}$ fluorinated alkyl group, but from the viewpoints of further improving the flame retardancy and stability and safety at high temperatures and high voltages of the electrolytic solution, both of $Rf^1$ and $Rf^2$ are preferably $C_1$-$C_{10}$ fluorinated alkyl groups. In this case, $Rf^1$ and $Rf^2$ may be the same as or different from one another.

In particular, it is preferred that $Rf^1$ and $Rf^2$ be the same as or different from one another, $Rf^1$ be a $C_3$-$C_6$ fluorinated alkyl group, and $Rf^2$ be a $C_2$-$C_5$ fluorinated alkyl group.

If the total number of carbon atoms of $Rf^1$ and $Rf^2$ is excessively small, the boiling point of the fluorinated ether is excessively low. If the total number of carbon atoms of $Rf^1$ and $Rf^2$ is excessively large, the solubility for the electrolyte salt decreases to gradually have an adverse effect on the compatibility with the other solvents, and also the viscosity increases to deteriorate the rate characteristics (viscosity). The cases with the number of carbon atoms of $Rf^1$ being 3 or 4 and the number of carbon atoms of $Rf^2$ being 2 or 3 are advantageous from the viewpoints of excellent boiling point and excellent rate characteristics.

The fluorinated ether (I) preferably has a fluorine content of 40 to 75% by mass. The fluorinated ether (I) with the fluorine content in this range exhibits a particularly excellent balance between the incombustibility and compatibility. The fluorine content in this range is also preferred from the viewpoints of good oxidation resistance and good safety.

The lower limit for the fluorine content is more preferably 45% by mass, still more preferably 50% by mass, and particularly preferably 55% by mass. The upper limit is more preferably 75% by mass, still more preferably 70% by mass, and particularly preferably 66% by mass.

The fluorine content herein is a value calculated based on the structural formula of the fluorinated ether (I) from {(number of fluorine atoms×19)/molecular weight of fluorinated ether (I)}×100(%).

Examples of $Rf^1$ include $CF_3CF_2CH_2$—, $CF_3CFHCF_2$—, $HCF_2CF_2CF_2$—, $HCF_2CF_2CH_2$—, $CF_3CF_2CH_2CH_2$—, $CF_3CFHCF_2CH_2$—, $HCF_2CF_2CF_2CF_2$—, $HCF_2CF_2CF_2CH_2$—, $HCF_2CF_2CH_2CH_2$—, and $HCF_2CF(CF_3)CH_2$—. Examples of $Rf^2$ include —$CH_2CF_2CF_3$, —$CF_2CFHCF_3$, —$CF_2CF_2CF_2H$, —$CH_2CF_2CF_2H$, —$CH_2CH_2CF_2CF_3$, —$CH_2CF_2CFHCF_3$, —$CF_2CF_2CF_2CF_2H$, —$CH_2CF_2CF_2CF_2H$, —$CH_2CH_2CF_2CF_2H$, —$CH_2CF(CF_3)CF_2H$, —$CF_2CF_2H$, —$CH_2CF_2H$, and —$CF_2CH_3$.

Specific examples of the fluorinated ether (I) include $HCF_2CF_2CH_2OCF_2CF_2H$, $CF_3CF_2CH_2OCF_2CF_2H$, $HCF_2CF_2CH_2OCF_2CFHCF_3$, $CF_3CF_2CH_2OCF_2CFHCF_3$, $C_6F_{13}OCH_3$, $C_6F_{13}OC_2H_5$, $C_8F_{17}OCH_3$, $C_8F_{17}OC_2H_5$, $CF_3CFHCF_2CH(CH_3)OCF_2CFHCF_3$, $HCF_2CF_2OCH(C_2H_5)_2$, $HCF_2CF_2OC_4H_9$, $HCF_2CF_2OCH_2CH(C_2H_5)_2$, and $HCF_2CF_2OCH_2CH(CH_3)_2$.

In particular, the fluorinated ether (I) has high polarizability and a high boiling point if it contains $HCF_2$— or $CF_3CFH$— at one or both of the terminals. The boiling point of the fluorinated ether (I) is preferably 67° C. to 120° C., more preferably 80° C. or higher, and still more preferably 100° C. or higher.

Such a fluorinated ether (I) is, for example, one or more of $CF_3CH_2OCF_2CFHCF_3$, $CF_3CF_2CH_2OCF_2CFHCF_3$, $HCF_2CF_2CH_2OCF_2CFHCF_3$, $HCF_2CF_2CH_2OCH_2CF_2CF_2H$, $CF_3CFHCF_2CH_2OCF_2CFHCF_3$, $HCF_2CF_2CH_2OCF_2CF_2H$, and $CF_3CF_2CH_2OCF_2CF_2H$.

From the viewpoints of a high boiling point, favorable compatibility with the other solvents and favorable solubility for the electrolyte salt, at least one of $HCF_2CF_2CH_2OCF_2CFHCF_3$ (boiling point: 106° C.), $CF_3CF_2CH_2OCF_2CFHCF_3$ (boiling point: 82° C.), $HCF_2CF_2CH_2OCF_2CF_2H$ (boiling point: 88° C.), and $CF_3CF_2CH_2OCF_2CF_2H$ (boiling point: 68° C.) are preferred, and $HCF_2CF_2CH_2OCF_2CFHCF_3$ (boiling point: 106° C.) and $HCF_2CF_2CH_2OCF_2CF_2H$ (boiling point: 88° C.) are more preferred.

Examples of the $C_3$-$C_6$ cyclic ethers include 1,3-dioxane, 2-methyl-1,3-dioxane, 4-methyl-1,3-dioxane, 1,4-dioxane, and fluorinated compounds of these. Preferred among these are dimethoxy methane, diethoxy methane, ethoxy methoxy methane, ethylene glycol-n-propyl ether, ethylene glycol di-n-butyl ether, and diethylene glycol dimethyl ether from the viewpoints of high solubility for the lithium ions and an increase in the degree of ionic dissociation. Particularly preferred are dimethoxy methane, diethoxy methane, and ethoxy methoxy methane from the viewpoints of low viscosity and high degree of ion conductivity.

The typical amount of the ether compound based on 100 vol % of the nonaqueous solvent is preferably 5 vol % or more, more preferably 10 vol % or more, and still more preferably 15 vol % or more, while it is preferably 70 vol % or less, more preferably 60 vol % or less, and still more preferably 50 vol % or less. The amount in this range is likely to certainly increase the degree of dissociation of lithium ions of the linear ether and increase the ion conductivity due to a decrease in the viscosity. Also, if the negative electrode active material is a carbonaceous material, the case can be easily avoided in which the linear ethers are charged together with lithium ions to reduce the capacity.

The electrolytic solution of the present invention may contain, as well as the above solvent, other components according to the purpose. Examples of the other components include unsaturated cyclic carbonates, nitrogen-containing compounds, boron-containing compounds, organosilicon-containing compounds, and overcharge inhibitors.

The unsaturated cyclic carbonate is a cyclic carbonate, and has at least one carbon-carbon unsaturated bond in a molecule. The electrolytic solution of the present invention can contain an unsaturated cyclic carbonate for formation of a film on the surface of the negative electrode in the nonaqueous electrolytic cell and for improved life of the cell.

Examples of the unsaturated cyclic carbonate include vinylene carbonate compounds such as vinylene carbonate (VC), methyl vinylene carbonate, ethyl vinylene carbonate, 4,5-dimethyl vinylene carbonate, and 4,5-diethyl vinylene carbonate; and vinyl ethyelene carbonate compounds such as 4-vinyl ethylene carbonate (VEC), 4-methyl-4-vinyl ethylene carbonate, 4-ethyl-4-vinyl ethylene carbonate, 4-n-propyl-4-vinylene ethylene carbonate, 5-methyl-4-vinyl ethylene carbonate, 4,4-divinyl ethylene carbonate, 4,5-divinyl ethylene carbonate, 4,4-dimethyl-5-methylene ethylene carbonate, and 4,4-diethyl-5-methylene ethylene carbonate. In particular, vinylene carbonate, 4-vinyl ethylene carbonate, 4-methyl-4-vinyl ethylene carbonate, and 4,5-divinyl ethylene carbonate are preferred, and vinylene carbonate and 4-vinyl ethylene carbonate are particularly preferred.

The molecular weight of the unsaturated cyclic carbonate may be any value that does not significantly deteriorate the effects of the present invention. The molecular weight is preferably from 50 to 250 inclusive. The molecular weight in this range is likely to secure the solubility of the unsaturated cyclic carbonate in the nonaqueous electrolytic solution, and thus contributes to full achievement of the effects of the present invention. The molecular weight of the unsaturated cyclic carbonate is more preferably from 80 to 150 inclusive.

Examples of the unsaturated cyclic carbonate may be used alone or in any combination in any proportion. The amount of the unsaturated cyclic carbonate may be any value that does not significantly deteriorate the effects of the present invention. The amount of the unsaturated cyclic carbonate based on 100% by mass of the nonaqueous electrolytic solution is preferably 0.01% by mass or more, more preferably 0.1% by mass or more, and still more preferably 0.2% by mass or more, while it is preferably 5% by mass or less, more preferably 4% by mass or less, and still more preferably 3% by mass or less. The amount in such a range is likely to enable the nonaqueous electrolytic cell to exhibit sufficiently improved cyclic characteristics, and is also likely to deteriorate the high-temperature storage characteristics, increase the amount of gas generated, and lead to insufficient discharge capacity retention factor. An excessively large amount may increase the resistance to lead to a low output and poor load characteristics.

Also, a fluorinated unsaturated cyclic carbonate is suitable.

The number of fluorine atoms of the fluorinated unsaturated cyclic carbonate is not particularly limited if it is 1 or more. In particular, the number of fluorine atoms is typically 6 or less, preferably 4 or less, and most preferably 1 or 2.

Examples of the fluorinated unsaturated cyclic carbonate include fluorinated vinylene carbonate derivatives, and fluorinated ethylene carbonate derivatives obtained by substitution with a substituent having an aromatic ring or a carbon-carbon double bond.

Examples of the fluorinated vinylene carbonate derivatives include 4-fluorovinylene carbonate, 4-fluoro-5-methyl vinylene carbonate, 4-fluoro-5-phenyl vinylene carbonate, 4-allyl-5-fluorovinylene carbonate, and 4-fluoro-5-vinyl vinylene carbonate.

Examples of the fluorinated ethylene carbonate derivatives obtained by substitution with a substituent having an aromatic ring or a carbon-carbon double bond include 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, 4,5-difluoro-4,5-diallylethylene carbonate, 4-fluoro-4-phenylethylene carbonate, 4-fluoro-5-phenylethylene carbonate, 4,4-difluoro-5-phenylethylene carbonate, and 4,5-difluoro-4-phenylethylene carbonate.

The molecular weight of the fluorinated unsaturated cyclic carbonate may be any value that does not significantly deteriorate the effects of the present invention. The molecular weight is preferably from 50 to 500 inclusive. The molecular weight in this range is likely to secure the solubility of the fluorinated cyclic carbonate in the nonaqueous electrolytic solution, and thus contribute to achievement of the effects of the present invention.

The fluorinated unsaturated cyclic carbonate may be used alone or in any combination in any proportion. Also, the amount of the fluorinated unsaturated cyclic carbonate may be any value that does not significantly deteriorate the effects of the present invention. The typical amount of the fluorinated unsaturated cyclic carbonate based on 100% by mass of the electrolytic solution is preferably 0.01% by mass or more, more preferably 0.1% by mass or more, and still more preferably 0.2% by mass or more, while it is preferably 10% by mass or less, more preferably 8% by mass or less, and still more preferably 6% by mass or less. The amount in such a range is likely to enable the nonaqueous electrolytic cell to exhibit sufficiently improved cyclic characteristics, and is also likely to avoid a case that the high-temperature storage characteristics deteriorate, the amount of gas generated increases, and thus the discharge capacity retention factor decreases.

Examples of the nitrogen-containing compounds include nitriles such as 1-methyl-2-pyrrolidinone, 1-methyl-2-piperidone, 3-methyl-2-oxazolidinone, 1,3-dimethyl-2-imidazolidinone and N-methylsuccinimide, fluorine-containing nitriles, carboxylic amides, fluorine-containing carboxylic amides, sulfonic acid amides, and fluorine-containing sulfonic acid amides.

Examples of the boron-containing compounds include boric esters such as trimethyl borate and triethyl borate, boric ethers, and alkyl boric acids.

Examples of the organosilicon-containing compounds include $(CH_3)_4$—Si and $(CH_3)_3$—Si—Si$(CH_3)_3$.

From the viewpoints of inhibition of breakage and ignition of the cell upon overcharge, the overcharge inhibitor is preferably one that has an aromatic ring. Specific examples of the overcharge inhibitor having an aromatic ring include aromatic compounds such as cyclohexylbenzene, dichloroaniline, toluene, biphenyl, alkylbiphenyl, terphenyl, partially hydrogenated terphenyl, t-butylbenzene, t-amyl benzene, diphenyl ether, benzofuran, and dibenzofuran; fluorinated compounds of aromatic compounds, such as hexafluorobenzene, fluorobenzene, 2-fluorobiphenyl, o-cyclohexylfluorobenzene, and p-cyclohexylfluorobenzene; and fluorine-containing anisole compounds such as 2,4-difluoroanisole, 2,5-difluoro anisole, 2,6-difluoro anisole, and 3,5-difluoro anisole. Preferred among these are aromatic compounds such as biphenyl, alkyl biphenyl, terphenyl, partially hydrogenated terphenyl, cyclohexylbenzene, t-butylbenzene, t-amylbenzene, diphenyl ether, and dibenzofuran. These may be used alone or in combination. If they are used in combination, a combination of cyclohexylbenzene with t-butylbenzene or t-amylbenzene, and a combination of at least one selected from oxygen-free aromatic compounds such as biphenyl, alkyl biphenyl, terphenyl, partially hydrogenated terphenyl, cyclohexylbenzene, t-butylbenzene, and t-amylbenzene, with at least one selected from oxygen-containing aromatic compounds such as diphenyl ether and dibenzofuran are particularly preferred from the viewpoint of the balance between the overcharge inhibition characteristics and high-temperature storage characteristics.

The amount of the overcharge inhibitor may be any value that does not significantly deteriorate the effects of the present invention. The amount of the overcharge inhibitor based on 100% by mass of the electrolytic solution is preferably from 0.1% by mass to 5% by mass inclusive. The amount in this range is likely to enable the overcharge inhibitor to fully achieve its effects, and avoid cases such as a decrease in the cell characteristics such as high-temperature storage characteristics. The amount of the overcharge inhibitor is more preferably 0.2% by mass or more, still more preferably 0.3% by mass or more, and particularly preferably 0.5% by mass or more, while it is more preferably 3% by mass or less, and still more preferably 2% by mass or less.

The nonaqueous solvent may contain, as well as the above components, other known auxiliary agents such as an incombustible agent (flame retardant), a surfactant, a highly dielectric additive, and a cycle and rate characteristics improver.

Examples of the incombustible agent (flame retardant) include phosphate esters and phosphazene-based compounds, such as $(CH_3O)_3P=O$ and $(CF_3CH_2O)_3P=O$.

The surfactant may be any of a cationic surfactant, an anionic surfactant, a nonionic surfactant, and an amphoteric surfactant, but is preferably a fluorine-containing surfactant from the viewpoints of good cycle characteristics and good rate characteristics.

Addition of a surfactant contributes to improvement of capacity characteristics and rate characteristics.

Examples of the highly dielectric additive include sulfolane, methyl sulfolane, γ-butyrolactone, γ-valerolactone, acetonitrile, and propionitrile.

Examples of the cycle characteristics and rate characteristics improver include methyl acetate, ethyl acetate, tetrahydrofuran, and 1,4-dioxane.

Examples of the other known auxiliary agents include carbonate compounds such as erythritane carbonate, spirobis-dimethylene carbonate, and methoxyethyl-methyl carbonate; carboxylic anhydrides such as succinic anhydride, glutaric anhydride, maleic anhydride, citraconic anhydride, glutaconic anhydride, itaconic anhydride, diglycolic anhydride, cyclohexanedicarboxylic anhydride, cyclopentane tetracarboxylic dianhydride, and phenyl succinic anhydride; spiro compounds such as 2,4,8,10-tetraoxaspiro[5,5]undecane and 3,9-divinyl-2,4,8,10-tetraoxaspiro[5,5]undecane; sulfur-containing compounds such as ethylene sulfite, 1,3-propanesultone, 1-fluoro-1,3-propanesultone, 2-fluoro-1,3-propanesultone, 3-fluoro-1,3-propanesultone, 1-propene-1,3-sultone, 1-fluoro-1-propene-1,3-sultone, 2-fluoro-1-propene-1,3-sultone, 3-fluoro-1-propene-1,3-sultone, 1,4-butanesultone, 1-butene-1,4-sultone, 3-butene-1,4-sultone, methyl fluorosulfonate, ethyl fluorosulfonate, methyl methanesulfonate, ethyl methanesulfonate, busulfan, sulfolene, diphenylsulfone, linear sulfones (e.g. N,N-dimethylmethanesulfonamide, N,N-diethyl methanesulfonamide), fluorine-containing linear sulfones, linear sulfonates, fluorine-containing linear sulfonates, cyclic sulfones, fluorine-containing cyclic sulfones, cyclic sulfonates, fluorine-containing cyclic sulfonates, sulfonic halides, and fluorine-containing sulfonic halides; and fluorine-containing aromatic compounds such as hydrocarbon compounds (e.g. heptane, octane, nonane, decane, cycloheptane), fluorobenzene, difluorobenzene, hexafluorobenzene, and benzotrifluoride. These may be used alone or in combination. Addition of such auxiliary agents can improve the capacity retention characteristics and cycle characteristics after high-temperature storage.

The electrolytic solution of the present invention further contains an electrolyte salt.

Examples of the electrolyte salt include known metal salts, liquid salts (ionic liquid), inorganic polymer salts, and organic polymer salts.

These electrolyte salts can be an appropriately suitable known compound depending on the purpose of use of the electrolytic solution, but a lithium salt is preferred.

Examples of the above lithium salt include inorganic lithium salts such as $LiPF_6$ and $LiBF_4$; and lithium salts of fluorine-containing organic acids such as $LiCF_3SO_3$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, $LiBF_2(C_2F_5SO_2)_2$, lithium difluoro(oxalate)borate, lithium bis(oxalate)borate, $LiPO_2F$, LiFSI, and salts represented by the formula: $LiPF_a(C_nF_{2n+1})_{6-a}$ (wherein a is an integer of 0 to 5, and n is an integer of 1 to 6). These may be used alone or in combination.

Here, at least one lithium salt is preferably $LiPF_6$ from the viewpoints of improving the characteristics such as the output characteristics, high rate charge and discharge characteristics, high-temperature storage characteristics, and cycle characteristics.

Examples of the salts represented by the formula: $LiPF_a(C_nF_{2n+1})_{6-a}$ include $LiPF_3(CF_3)_3$, $LiPF_3(C_2F_5)_3$, $LiPF_3(C_3F_7)_3$, $LiPF_3(C_4F_9)_3$, $LiPF_4(CF_3)_2$, $LiPF_4(C_2F_5)_2$, $LiPF_4(C_3F_7)_2$, and $LiPF_4(C_4F_9)_2$ (where the alkyl groups represented by $C_3F_7$ and $C_4F_9$ in the formulas may have a linear or branched structure).

The concentration of the electrolyte salt differs depending on the conditions such as the required current density, use, and the kind of the electrolyte salt, but is preferably 0.2 mol/L or higher, more preferably 0.5 mol/L or higher, and still more preferably 0.7 mol/L or higher in the electrolytic solution. An excessively low concentration of the electrolyte salt may give insufficient electric conductivity of the electrolytic solution. The concentration of the electrolyte salt is preferably 3.0 mol/L or lower, and more preferably 2.0 mol/L or lower in the electrolytic solution. An excessively high concentration may give high viscosity to lead to low electric conductivity, resulting in low cell performance. The concentration in the above range gives improved characteristics such as the low-temperature characteristics, cycle characteristics, and high-temperature characteristics.

The electrolytic solution of the present invention may be a gel electrolytic solution obtained by gelling (plasticizing) the electrolytic solution with a polymer material.

Examples of the polymer material include known polyethylene oxides and polypropylene oxides, and modified products thereof (JP H08-222270 A, JP 2002-100405 A); polyacrylate polymers, polyacrylonitriles, and fluororesins such as polyvinylidene fluorides and vinylidene fluoride-hexafluoropropylene copolymers (JP H04-506726 T, JP H08-507407 T, JP H10-294131 A); and complexes of these fluororesins and hydrocarbon resins (JP H11-35765 A, JP H11-86630 A). In particular, polyvinylidene fluoride and vinylidene fluoride-hexafluoropropylene copolymers are preferred as polymer materials for gel electrolytes.

In addition, the electrolytic solution of the present invention may also contain the ion-conductive compound described in Japanese Patent Application No. 2004-301934.

This ion-conductive compound is an amorphous fluorine-containing polyether compound having a fluorine-containing group in the side chain, and is represented by the following formula (1-1):

$$A\text{-}(D)\text{-}B \tag{1-1}$$

wherein D is represented by the following formula (2-1):

$$-(D1)_n\text{-}(FAE)_m\text{-}(AE)_p\text{-}(Y)_q- \tag{2-1}$$

[wherein D1 is an ether unit having a fluorine-containing ether group in the side chain, and is represented by the following formula (2a):

(2a)

(wherein Rf is a fluorine-containing ether group optionally having a crosslinkable functional group, and $R^{10}$ is a group or a bond that is linking Rf and the main chain); FAE is an ether unit having a fluorinated alkyl group in the side chain, and is represented by the following formula (2b):

(2b)

(wherein Rfa is a hydrogen atom or a fluorinated alkyl group optionally having a crosslinkable functional group, and $R^{11}$ is a group or a bond that is linking Rfa and the main chain);

AE is an ether unit represented by the following formula (2c):

(wherein $R^{13}$ is a hydrogen atom, an alkyl group optionally having a crosslinkable functional group, an aliphatic cyclic hydrocarbon group optionally having a crosslinkable functional group, or an aromatic hydrocarbon group optionally having a crosslinkable functional group; and $R^{12}$ is a group or a bond that is linking $R^{13}$ and the main chain);

Y is a unit having at least one of the moieties represented by the following formulas (2d-1) to (2d-3):

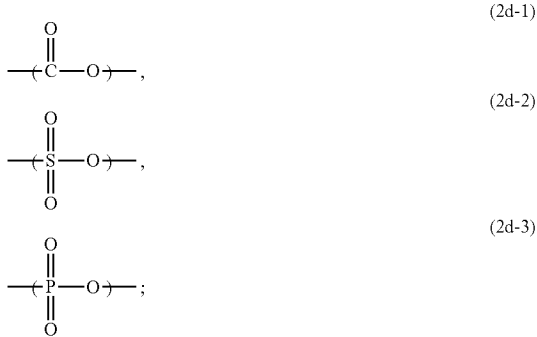

and n is an integer of 0 to 200; m is an integer of 0 to 200; p is an integer of 0 to 10000; q is an integer of 1 to 100, where n+m is not 0, and the linking order of D1, FAE, AE, and Y is not specified]; and A and B are the same as or different from one another, each representing a hydrogen atom, an alkyl group optionally containing a fluorine atom and/or a crosslinkable functional group, or a phenyl group optionally containing a fluorine atom and/or a crosslinkable functional group, a —COOH group, —OR (wherein R is a hydrogen atom or an alkyl group optionally having a fluorine atom and/or a crosslinking functional group), an ester group, or a carbonate group which optionally contains a fluorine atom and/or a crosslinkable functional group (wherein if D contains an oxygen atom at its terminal, A and B are not the —COOH group, —OR, ester group, or carbonate group).

The electrolytic solution of the present invention may further contain other additives according to need. Examples of the other additives include metal oxides and glass.

Since the electrolytic solution of the present invention can simultaneously improve the flame retardancy, low-temperature properties, withstand voltage, the solubility for the electrolyte salt, and the compatibility with a hydrocarbon solvent, the electrolytic solution is suitable as an electrolytic solution for electrochemical devices such as nonaqueous electrolytic cells. Such electrochemical devices including the electrolytic solution of the present invention is also one aspect of the present invention.

Examples of the electrochemical devices include lithium ion secondary cells, capacitors (electrolytic double layer capacitors), radical cells, solar cells (especially dye-sensitized solar cells), fuel cells, various electrochemical sensors, electrochromic elements, electrochemical switching elements, aluminum electrolytic capacitors, and tantalum electrolytic capacitors. In particular, lithium ion secondary cells are suitable.

The electrolytic solution of the present invention is suitable as an electrolytic solution for nonaqueous electrolytic cells, particularly lithium cells.

In particular, the electrolytic solution is suitable for a lithium cell including a positive electrode and a negative electrode which are capable of occluding or releasing lithium ions, a separator, and the electrolytic solution of the present invention.

Such a lithium cell including a negative electrode and a positive electrode which are capable of occluding or releasing lithium ions, a separator, and the above electrolytic solution is another aspect of the present invention.

<Negative Electrode>

(Negative Electrode Active Material)

In the following, a negative electrode active material used for the negative electrode is described. The negative electrode active material may be any material that is capable of electrochemically occluding or releasing lithium ions. Specific examples thereof include carbonaceous materials, metallic materials, and lithium-containing composite oxides of metals. These may be used alone or in any combination.

From the viewpoints of improving cell characteristics such as high-temperature storage characteristics, discharge capacity retention factor, load characteristics, and energy density especially in the case that the negative electrode active material is used together with the electrolytic solution of the present invention containing a compound represented by the formula (1), the negative electrode active material is preferably at least one selected from the group consisting of carbonaceous materials and metallic materials, and more preferably a metallic material.

As described above, the lithium cell of the present invention includes an electrolytic solution containing a specific compound, and a negative electrode containing a specific negative electrode active material, and thus has excellent high-temperature storage characteristics, excellent discharge capacity retention factor, and excellent load characteristics, i.e. favorable cell characteristics.

For a good balance between the initial irreversible capacity and high-current density charge and discharge characteristics, the carbonaceous material used as the above negative electrode active material is preferably selected from natural graphite, artificial graphite, and carbonaceous materials obtained by heating an artificial carbonaceous material and an artificial graphite material at least once at 400° C. to 3200° C.; carbonaceous materials having a negative electrode active material layer that is formed from at least two carbonaceous materials with different crystallinities and/or has an interface where the carbonaceous materials with different crystallinities are in contact with one another; and carbonaceous materials having a negative electrode active material layer that has an interface where at least two carbonaceous materials with different orientations are in contact with one another. These carbonaceous materials may be used alone or in any combination in any-proportion.

Examples of the carbonaceous materials obtained by heating an artificial carbonaceous material and an artificial graphite material at least once at 400° C. to 3200° C. include natural graphite, coal coke, petroleum coke, coal pitch, petroleum pitch, materials obtained by oxidizing these pitches, needle coke, pitch coke, carbon materials obtained by partially graphitizing these cokes, furnace black, acetylene black, pyrolysates of organic materials such as pitch-based carbon fibers, carbidable organic materials and carbides thereof, solutions obtained by dissolving a carbidable organic material in a low-molecular organic solvent such as benzene, toluene, xylene, quinoline, and n-hexane, and carbides of these solutions.

The metallic material (except for lithium-titanium composite oxides) used as the negative electrode active material may be any compound capable of occluding or releasing lithium, such as elemental lithium, elemental metals and alloys forming lithium alloys, or oxides, carbides, nitrides, silicides, sulfides, or phosphides of these metals. The elemental metals and alloys forming lithium alloys are preferably materials including group 13 and group 14 metals and metalloid elements, and more preferably elemental metals of aluminum, silicon, and tin (hereinafter, referred to as "specific metal elements"), and alloys or compounds containing these atoms. These metallic materials may be used alone or in any combination in any proportion.

Examples of the negative electrode active material having at least one atom selected from the specific metal elements include elemental metals of any single specific metal element, alloys formed from multiple specific metal elements, alloys formed from a single or multiple specific metal elements and a single or multiple other metal elements, and complex compounds of a compound containing a single or multiple specific metal elements with an oxide, a carbide, a nitride, a silicide, a sulfide, or a phosphide of the compound. Use of such an elemental metal, an alloy, or a metal compound as the negative electrode active material gives a high capacity to the cell.

The examples also include compounds formed as a result of complexly bonding these complex compounds with elements such as an elemental metal, an alloy, or a nonmetallic element. Specifically, for example in the case of silicon or tin, alloys of these elements and a metal not functioning as a negative electrode can be used. For example, in the case of tin, a complex compound containing five or six elements as a combination of a metal functioning as a negative electrode other than tin and silicon, a metal not functioning as a negative electrode, and a nonmetallic element can also be used.

Specific examples thereof include elemental Si, $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_6Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ (0<v≤2), LiSiO or elemental tin, $SnSiO_3$, LiSnO, $Mg_2Sn$, and $SnO_w$ (0<w≤2).

The specific examples also include composite materials containing Si or Sn as a first constituent element, and the second and third constituent elements. The second constituent element is at least one of cobalt, iron, magnesium, titanium, vanadium, chromium, manganese, nickel, copper, zinc, gallium, and zirconium. The third constituent element is at least one of boron, carbon, aluminum, and phosphorus.

Especially for high cell capacity and excellent cell characteristics, the above metallic material is preferably elemental silicon or tin (which may contain a trace amount of impurities), $SiO_v$ (0<v≤2), $SnO_w$ (0≤w≤2), a Si—Co—C composite material, a Si—Ni—C composite material, a Sn—Co—C composite material, or a Sn—Ni—C composite material.

The lithium-containing composite oxide of a metal used as the negative electrode active material may be any material capable of occluding or releasing lithium, but is preferably a material containing titanium and lithium from the viewpoint of the high-current density charge and discharge characteristics, more preferably a lithium-containing composite metal oxide material containing titanium, and still more preferably a composite oxide of lithium and titanium (hereinafter, abbreviated as "lithium-titanium composite oxide"). That is, a lithium-titanium composite oxide having a spinel structure is particularly preferably contained in the negative electrode active material for nonaqueous electrolytic cells because the output resistance greatly decreases.

The lithium-titanium composite oxide is preferably a compound represented by the following formula (J):

$$Li_xTi_yM_zO_4 \tag{J}$$

wherein M represents at least one element selected from the group consisting of Na, K, Co, Al, Fe, Ti, Mg, Cr, Ga, Cu, Zn, and Nb.

Particularly preferred among the compounds represented by the above formula (J), for a good balance of the cell characteristics, are compounds with the following compositions.

(i) 1.2≤x≤1.4, 1.5≤y≤1.7, z=0
(ii) 0.9≤x≤1.1, 1.9≤y≤2.1, z=0
(iii) 0.7≤x≤0.9, 2.1≤y≤2.3, z=0

Particularly preferred representative compositions of the above compounds are (i) $Li_{4/3}Ti_{5/3}O_4$ for the composition (i), $Li_1Ti_2O_4$ for the composition (ii), and $Li_{4/5}Ti_{11/5}O_4$ for the composition (iii). For compositions with Z≠0, a composition $Li_{4/3}Ti_{4/3}Al_{1/3}O_4$ is preferred, for example.

(Structure and Production of Negative Electrode)

The electrodes can be produced by any known method that does not significantly deteriorate the effects of the present invention. For example, a negative electrode can be formed by adding a binder, a solvent, and optionally additives such as a thickener, a conducting agent, and a filler to a negative electrode active material to prepare a slurry, applying the slurry to a current collector, drying the slurry, and pressing the dried product.

In the case of using an alloy material, a negative electrode may be formed by forming a thin-film layer (negative electrode active material layer) containing the above negative electrode active material by a method such as vacuum deposition, sputtering, or plating.

Examples of the form of the current collector in the case that the current collector is formed from a metallic material include metal foil, a metal cylinder, a metal coil, a metal plate, a metallic thin film, an expanded metal, a perforated metal, and a foaming metal. In particular, a metallic thin film is preferred, and copper foil is more preferred. Rolled copper foil obtained by rolling and electrolytic copper foil formed by electrolysis are still more preferred for a current collector.

The thickness of the current collector is typically 1 μm or larger, and preferably 5 μm or larger, while it is typically 100 μm or smaller, and preferably 50 μm or smaller. An excessively large thickness of the negative electrode collector may result in a very low capacity of the whole cell, whereas an excessively small thickness may make the handling difficult.

The binder for binding the negative electrode active material to the nonaqueous electrolytic solution or the solvent used for production of electrodes may be any material stable with the nonaqueous electrolytic solution or the solvent used for production of electrodes.

Specific examples thereof include resin-based polymers such as polyethylene, polypropylene, polyethylene terephthalate, polymethyl methacrylate, aromatic polyamide, polyimide, cellulose, and nitrocellulose; rubbery polymers such as SBR (styrene-butadiene rubber), isoprene rubber, butadiene rubber, fluororubber, NBR (acrylonitrile-butadiene rubber), and ethylene-propylene rubber; styrene-butadiene-styrene block copolymer or its hydrogenated products; thermoplastic elastomeric polymers such as EPDM (ethylene-propylene-diene terpolymer), styrene-ethylene-butadiene-styrene copolymer, styrene-isoprene-styrene block copolymer, or their hydrogenated products; soft resinous polymers such as syndiotactic-1,2-polybutadiene, polyvinyl acetate, ethylene-vinyl acetate copolymer, and propylene-α-olefin copolymer; fluorine-based polymers such as polyvinylidene fluoride, polytetrafluoroethylene, fluorinated polyvinylidene fluoride, and polytetrafluoroethylene-ethylene copolymer; and polymer compositions which have the ion conductivity for alkali metal ions (especially lithium ions). These may be used alone or in any combination in any proportion.

The proportion of the binder for binding the negative electrode active material is preferably 0.1% by mass or more, more preferably 0.5% by mass or higher, and particularly preferably 0.6% by mass or higher, while it is preferably 20% by mass or lower, more preferably 15% by mass or lower, still more preferably 10% by mass or lower, and particularly preferably 8% by mass or lower. A proportion of the binder higher than the above range based on the negative electrode active material may increase the proportion of the binder not contributing to the cell capacity, decreasing the cell capacity. A proportion of the binder lower than the above range may decrease the strength of the negative electrode.

Especially when a rubbery polymer represented by SBR is contained as a main component, the proportion of the binder based on the negative electrode active material is typically 0.1% by mass or higher, preferably 0.5% by mass or higher, and still more preferably 0.6% by mass or higher, while it is typically 5% by mass or lower, preferably 3% by mass or lower, and still more preferably 2% by mass or lower. When a fluorine-based polymer represented by polyvinylidene fluoride is contained as a main component, the proportion based on the negative electrode active material is typically 1% by mass or higher, preferably 2% by mass or higher, and still more preferably 3% by mass or higher, while it is typically 15% by mass or lower, preferably 10% by mass or lower, and still more preferably 8% by mass or lower.

The solvent for forming a slurry may be any kind of solvent capable of dissolving or dispersing the negative electrode active material, the binder, and a thickener and a conducting material which are added according to need. The solvent may be an aqueous solvent or an organic solvent.

Examples of the aqueous solvent include water and alcohols, and examples of the organic solvent include N-methyl pyrrolidone (NMP), dimethylformamide, dimethylacetamide, methyl ethyl ketone, cyclohexanone, methyl acetate, methyl acrylate, diethyltriamine, N,N-dimethylaminopropylamine, tetrahydrofuran (THF), toluene, acetone, diethylether, dimethylacetamide, hexamethyl phosphoric amide, dimethyl sulfoxide, benzene, xylene, quinoline, pyridine, methylnaphthalene, and hexane.

Especially when an aqueous solvent is used, it is preferred that the solvent contain additives such as a dispersant as well as the thickener, and be formed into a slurry using a latex such as SBR. These solvents may be used alone or in any combination in any proportion.

The thickener is usually used to adjust the viscosity of the slurry. Specific examples of the thickener include, but not particularly limited to, carboxymethyl cellulose, methyl cellulose, hydroxymethyl cellulose, ethyl cellulose, polyvinyl alcohol, oxidized starch, phosphorylated starch, casein, and their salts. These may be used alone or in any combination in any proportion.

In the case of using a thickener, the proportion of the thickener based on the negative electrode active material is typically 0.1% by mass or higher, preferably 0.5% by mass or higher, and still more preferably 0.6% by mass or higher, while it is typically 5% by mass or lower, preferably 3% by mass or lower, and still more preferably 2% by mass or lower. A proportion of the thickener lower than the above range based on the negative electrode active material may significantly decrease the coating properties. A proportion higher than the above range may decrease the proportion of the negative electrode active material in the negative electrode active material layer, which may decrease the cell capacity or increase the resistance between the negative electrode active materials.

The electrode structure of an electrode formed from the negative electrode active material is not particularly limited, but the density of the negative electrode active material present on the current collector is preferably 1 $g \cdot cm^{-3}$ or higher, more preferably 1.2 $g \cdot cm^{-3}$ or higher, and particularly preferably 1.3 $g \cdot cm^3$ or higher, but is preferably 2.2 $g \cdot cm^{-3}$ or lower, more preferably 2.1 $g \cdot cm^{-3}$ or lower, still more preferably 2.0 $g \cdot cm^{-3}$ or lower, and particularly preferably 1.9 $g \cdot cm^{-3}$ or lower. A density of the negative electrode active material present on the current collector higher than the above range may destroy the particles of the negative electrode active material, which may increase the initial irreversible capacity or result in poor high-current density charge and discharge characteristics due to low permeability of the nonaqueous electrolytic solution around the collector/negative electrode active material interface. A density lower than the above range may lead to low conductivity between the negative electrode active materials and cause high cell resistance, which may result in low capacity per unit volume.

The thickness of the negative electrode plate is designed in conformity with the positive electrode plate used, and is not particularly limited. The thickness of the combined plate layer except for the metal foil of the core material is typically 15 μm or larger, preferably 20 μm or larger, and more preferably 30 μm or larger, while it is typically 300 μm or smaller, preferably 280 μm or smaller, and more preferably 250 μm or smaller.

Also, on the surface of the negative electrode plate, substances with different compositions from the negative electrode active material may be deposited. Examples of the surface deposit include oxides such as aluminum oxide, silicon oxide, titanium oxide, zirconium oxide, magnesium oxide, calcium oxide, boron oxide, antimony oxide, and bismuth oxide, sulfates such as lithium sulfate, sodium sulfate, potassium sulfate, magnesium sulfate, calcium sulfate, and aluminum sulfate, and carbonates such as lithium carbonate, calcium carbonate, and magnesium carbonate.

<Positive Electrode>
(Positive Electrode Active Material)

In the following, a positive electrode active material used for positive electrodes is described.

The positive electrode active material may be any material capable of electrochemically occluding or releasing lithium ions, but is preferably a material containing lithium and at least one transition metal, for example. Specific examples thereof include lithium transition metal composite oxides and lithium-containing transition metal phosphate compounds. In particular, the positive electrode active material is preferably a lithium transition metal composite oxide.

The transition metal for the lithium transition metal composite oxides is preferably, for example, V, Ti, Cr, Mn, Fe, Co, Ni, and Cu. Specific examples of the composite oxides include lithium-cobalt composite oxides such as $LiCoO_2$, lithium-nickel composite oxides such as $LiNiO_2$, lithium-manganese composite oxides such as $LiMnO_2$, $LiMn_2O_4$, and $Li_2MnO_4$, and products obtained by partially substituting transition metal atoms mainly constituting the above lithium transition metal composite oxides with other elements such as Na, K, B, F, Al, Ti, V, Cr, Mn, Fe, Co, Li, Ni, Cu, Zn, Mg, Ga, Zr, Si, Nb, Mo, Sn, and W. Specific examples of substituted products include $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiNi_{0.45}Co_{0.10}Al_{0.45}O_2$, and $LiMn_{1.8}Al_{0.2}O_4$, and $LiMn_{1.5}Ni_{0.5}O_4$.

In particular, the above lithium transition metal composite oxide is preferably a lithium transition metal oxide represented by the following formula (2):

$$Li_{1+w}Mn_xNi_yCo_zO_2 \tag{2}$$

wherein w, x, y, and z satisfy the relations $0 \leq w < 0.4$, $0.3 < x < 1$, $0 \leq y < 0.4$, $0 \leq z \leq 0.4$, $0 < y+z$, and $w+x+y+z=1$.

The transition metal of lithium-containing transition metal phosphate compounds is preferably V, Ti, Cr, Mn, Fe, Co, Ni, and Cu. Specific examples of the compounds include iron phosphates such as $LiFePO_4$, $Li_3Fe_2(PO_4)_3$, and $LiFeP_2O_7$, cobalt phosphates such as $LiCoPO_4$, and products obtained by partially substituting transition metal atoms mainly constituting lithium transition metal phosphate compounds with other elements such as Al, Ti, V, Cr, Mn, Fe, Co, Li, Ni, Cu, Zn, Mg, Ga, Zr, Nb, and Si.

Also, lithium phosphate is preferably contained in the positive electrode active material because it contributes to improved continuous charging characteristics. Although there is no restriction on use of lithium phosphate, lithium phosphate is preferably mixed with the above positive electrode active material used. The lower limit for the amount of the lithium phosphate used based on the total amount of the positive electrode active material and lithium phosphate is preferably 0.1% by mass or more, more preferably 0.3% by mass or more, and still more preferably 0.5% by mass or more, while the upper limit is preferably 10% by mass or less, more preferably 8% by mass or less, and still more preferably 5% by mass or less.

Also, on the surface of the positive electrode active material, substances with different compositions from the positive electrode active material may be deposited. Examples of the surface deposit include oxides such as aluminum oxide, silicon oxide, titanium oxide, zirconium oxide, magnesium oxide, calcium oxide, boron oxide, antimony oxide, and bismuth oxide, sulfates such as lithium sulfate, sodium sulfate, potassium sulfate, magnesium sulfate, calcium sulfate, and aluminum sulfate, carbonates such as lithium carbonate, calcium carbonate, and magnesium carbonate, and carbon.

Such a surface deposit can be adhered to the surface of the positive electrode active material by, for example, a method of dissolving or suspending a surface deposit precursor in a solvent, impregnating the positive electrode active material with the surface deposit precursor, and drying the material; a method of dissolving or suspending a surface deposit precursor in a solvent, impregnating the positive electrode active material with the surface deposit precursor, and heating the material for a reaction; and a method of adding a surface deposit precursor to the positive electrode active material precursor, and simultaneously firing the materials. Here, if carbon is to be deposited on the positive electrode active material, it is also possible to mechanically adhering a carbonaceous material in the form of activated carbon, for example, after the formation of the electrode.

The lower limit for the amount by mass of the surface deposit based on the amount of the positive electrode active material is preferably 0.1 ppm or more, more preferably 1 ppm or more, and still more preferably 10 ppm or more, while the upper limit is preferably 20% or less, more preferably 10% or less, and still more preferably 5% or less. The surface deposit enables suppression of oxidation reaction of the electrolytic solution on the surface of the positive electrode active material, and an increase of the cell life. Still, the effect may not be fully achieved if the amount of the deposit is excessively small, whereas the resistance for inhibiting occlusion and release of lithium ions may increase if the amount of the deposit is excessively large.

Such a positive electrode active material on the surface of which a substance having a different composition is deposited is referred to as a "positive electrode active material" herein.

(Form)

The form of the particles of the positive electrode active material is, for example, a mass, a polyhedron, a sphere, an elliptical sphere, a plate, a needle, or a pillar which have been conventionally employed. Also, the primary particles may aggregate to form secondary particles.

(Tap Density)

The tap density of the positive electrode active material is preferably 0.5 g/cm³ or higher, more preferably 0.8 g/cm³ or higher, and still more preferably 1.0 g/cm³ or higher. A tap density of the positive electrode active material lower than the above lower limit may lead to an increased amount of the dispersion medium required and increased amounts of the conducting material and the binder required in formation of the positive electrode active material, which may restrict the filling factor of the positive electrode active material in the positive electrode active material layer, leading to restriction of the cell capacity. Use of composite oxide powder with a high tap density enables formation of a positive electrode active material layer with a high density. Typically, a higher tap density is better, and there is not a particular upper limit on the tap density. An excessively high tap density, however, may limit the rate of dispersion of lithium ions in the positive electrode active material layer with the electrolytic solution as a medium, and thereby lead to low load characteristics. Accordingly, the upper limit is preferably 4.0 g/cm³ or lower, more preferably 3.7 g/cm³ or lower, and still more preferably 3.5 g/cm³ or lower.

The tap density herein is determined as a powder packing density (tap density) g/cc when a 10-ml glass graduated cylinder containing the powder of the positive electrode active material (5 to 10 g) is tapped 200 times with a stroke of about 20 mm.

(Median Size d50)

The median size d50 of particles of a positive electrode active material (secondary particle sizes when the primary particles aggregate to form secondary particles) is preferably 0.3 μm or more, more preferably 0.5 μm or more, still more preferably 0.8 μm or more, and most preferably 1.0 μm or more, and the upper limit is preferably 30 μm or less, more preferably 27 μm or less, still more preferably 25 μm or less, and most preferably 22 μm or less. A median size smaller than the lower limit may fail to give a high tap density to the resulting product. A median size larger than the upper limit may lead to a long time for diffusion of lithium in the particles to give low cell characteristics, or give stickiness to the slurry formed from the active material, conducting material and a binder, which may cause a problem when the slurry is applied to form a thin film such that the positive electrode of the cell is formed. Here, mixing at least two of the above positive electrode active materials with different median sizes d50 makes it possible to further improve the filling property.

The median size d50 herein is measured with a known laser diffraction particle size analyzer. If LA-920 from HORIBA, Ltd. is used as the particle counter, the median size is measured by dispersing the particles of the positive electrode active material in a 0.1% by mass aqueous solution of sodium hexametaphosphate as a dispersion medium for measurement by 5-minute ultrasonication, and then setting the measurement refractive index to 1.24.

(Average Primary Particle Size)

If the primary particles aggregate to form secondary particles, the average primary particle size of the positive electrode active material is preferably 0.05 µm or larger, more preferably 0.1 µm or larger, and still more preferably 0.2 µm or larger, and the upper limit is preferably 5 µm or smaller, more preferably 4 µm or smaller, still more preferably 3 µm or smaller, and most preferably 2 µm or smaller. An average primary particle size larger than the above upper limit may make it difficult for the primary particles to form spherical secondary particles, which may adversely affect the powder filling property or greatly reduce the specific surface area, resulting in a high possibility of deterioration of the cell characteristics such as output characteristics. In contrast, an average primary particle size smaller than the above lower limit usually causes underdevelopment of crystals, which may cause problems such as inferior charge and discharge reversibility.

The primary particle size herein is measured by observation with a scanning electron microscope (SEM). Specifically, the primary particle size is determined by measuring the lengths of randomly selected 50 primary particles in a photograph taken at a magnification of 10000×, the lengths each being the maximum of segments formed by a straight line in the horizontal direction and the boundaries formed between the left and right areas of the primary particle; and averaging the measured lengths.

(BET Specific Surface Area)

The BET specific surface area of the positive electrode active material is preferably 0.1 $m^2/g$ or larger, more preferably 0.2 $m^2/g$ or larger, and still more preferably 0.3 $m^2/g$ or larger, and the upper limit is preferably 50 $m^2/g$ or smaller, more preferably 40 $m^2/g$ or smaller, and still more preferably 30 $m^2/g$ or smaller. A BET specific surface area smaller than the above range is likely to cause low cell characteristics, while a BET specific surface area larger than the above range may make it difficult for a tap density to increase and cause a problem in the coating properties in formation of a positive electrode active material layer.

The BET specific surface area herein is defined as a value obtained by pre-drying a specimen under nitrogen flow at 150° C. for 30 minutes using a surface area meter (e.g. fully automatic surface area analyzer from Ohkura Riken In.), and determining the nitrogen adsorption BET (single point BET) by the gas flow method using a nitrogen-helium mixed gas of which the pressure of nitrogen relative to the atmospheric pressure is precisely adjusted to 0.3.

(Method for Producing Positive Electrode Active Material)

The method for producing a positive electrode active material is a common method as a method for producing an inorganic compound. In particular, various methods are possible for producing spherical or elliptical active materials. Examples of the method include a method of dissolving or grinding/dispersing a base material of a transition metal in a solvent such as water, forming spherical precursors by adjusting the pH with stirring and collecting the precursors, drying the precursors according to need, adding a Li source such as LiOH, $Li_2CO_3$, and $LiNO_3$, and firing the resulting product at high temperatures.

For production of a positive electrode, one kind of the above positive electrode active materials may be used or one or more kinds of the above positive electrode active materials with different compositions may be used in any combination in any proportion. In this case, examples of preferred combinations include a combination of LiCoO2 with LiMn2O4 or the material where a part of Mn is replaced by another transition metal or the like (for example, LiNi0.33Co0.33Mn0.33O2), or a combination with LiCoO2 or the material where a part of Co is replaced by another transition metal or the like.

<Structure and Production Method of Positive Electrode>

In the following, the structure of the positive electrode is described. The positive electrode herein can be produced by forming a positive electrode active material layer containing a positive electrode active material and a binder on the current collector. The positive electrode containing a positive electrode active material can be produced by an ordinary method. That is, a positive electrode can be obtained by forming a positive electrode active material layer on the current collector by, for example, any of the following methods. One method is dry mixing of the positive electrode active material, binder, and additives such as a conducting material and a thickener according to need to form a sheet, and pressure bonding the resulting sheet onto a positive electrode current collector. Another method is dissolving or dispersing of the above materials in a liquid medium to form a slurry, applying the slurry to the positive electrode current collector, and drying the slurry.

The amount of the positive electrode active material in the positive electrode active material layer is preferably 80% by mass or more, more preferably 82% by mass or more, and particularly preferably 84% by mass or more. The upper limit is preferably 99% by mass or less, and more preferably 98% by mass or less. A small amount of the positive electrode active material in the positive electrode active material layer may lead to insufficient electric capacity. In contrast, an excessively large amount may lead to insufficient strength of the positive electrode.

The positive electrode active material layer obtained by application and drying is preferably compacted by hand pressing or roller pressing, for example, to increase the packing density of the positive electrode active material. The lower limit for the density of the positive electrode active material layer is preferably 1.5 $g/cm^3$ or higher, more preferably 2 $g/cm^3$ or higher, and still more preferably 2.2 $g/cm^3$ or higher, and the upper limit is preferably 5 $g/cm^3$ or lower, more preferably 4.5 $g/cm^3$ or lower, and still more preferably 4 $g/cm^3$ or lower. A density higher than the above range may decrease the permeability of the electrolytic solution around the collector/active material interface, especially the charge and discharge characteristics at high-current density, failing to achieve high output. A density lower than the above range may decrease the conductivity between the active materials to increase the cell resistance, failing to achieve high output.

(Conducting Material)

The conducting material may be any known conducting material. Specific examples thereof include metallic materials such as copper and nickel; and carbon materials such as graphites (e.g. natural graphite, synthetic graphite), carbon blacks (e.g. acetylene black), and amorphous carbons (e.g.

needle coke). These may be used alone or in any combination in any proportion. The amount of the conducting material in the positive electrode active material layer is typically 0.01% by mass or more, preferably 0.1% by mass or more, more preferably 1% by mass or more, and the upper limit is typically 50% by mass or less, preferably 30% by mass or less, and more preferably 15% by mass or less. An amount less than the above range may lead to insufficient conductivity. An amount more than the upper limit of the above range may lead to low cell capacity.

(Binder)

The binder used for production of the positive electrode active material layer is not particularly limited, and may be, in the case of a coating method, any material that can be dissolved or dispersed in a liquid medium used for production of an electrode. Specific examples include resin-based polymers such as polyethylene, polypropylene, polyethylene terephthalate, polymethylmethacrylate, polyimide, aromatic polyamide, cellulose, and nitrocellulose; rubbery polymers such as SBR (styrene-butadiene rubber), NBR (acrylonitrile-butadiene rubber), fluororubber, isoprene rubber, butadiene rubber, and ethylene-propylene rubber; thermoplastic elastomeric polymers such as styrene-butadiene-styrene block copolymer and its hydrogenated products, EPDM (ethylene-propylene-diene terpolymer), styrene-ethylene-butadiene-ethylene copolymer, and styrene-isoprene-styrene block copolymer and its hydrogenated products; elastic resinous polymers such as syndiotactic-1,2-polybutadiene, polyvinyl acetate, ethylene-vinyl acetate copolymer, and propylene-α-olefin copolymer; fluorine-based polymers such as polyvinylidene fluoride (PVdF), polytetrafluoroethylene, fluorinated polyvinylidene fluoride, and a polytetrafluoroethylene-ethylene copolymer; and polymer compositions which have the ion conductivity for alkali metal ions (especially lithium ions). These materials may be used alone or in any combination in any proportion.

The proportion of the binder in the positive electrode active material layer is typically 0.1% by mass or higher, preferably 1% by mass or higher, and still more preferably 1.5% by mass or higher, and the upper limit is typically 80% by mass or lower, preferably 60% by mass or lower, still more preferably 40% by mass or lower, and most preferably 10% by mass or lower. An excessively low proportion of the binder may not enable sufficient holding of the positive electrode active material to lead to insufficient mechanical strength of the positive electrode, deteriorating the cell characteristics such as cycle characteristics. An excessively high proportion may cause a decrease in the cell capacity and conductivity.

(Slurry Forming Solvent)

The solvent for forming a slurry may be any solvent capable of dissolving or dispersing the positive electrode active material, the conducting material, the binder, and a thickener used according to need. The solvent may be an aqueous solvent or an organic solvent. Examples of the aqueous solvent include water, and a mixed solvent of an alcohol and water. Examples of the organic solvent include aliphatic hydrocarbons such as hexane; aromatic hydrocarbons such as benzene, toluene, xylene, and methylnaphthalene; heterocyclic compounds such as quinoline and pyridine; ketones such as acetone, methyl ethyl ketone, and cyclohexanone; esters such as methyl acetate and methyl acrylate; amines such as diethylenetriamine and N,N-dimethylaminopropylamine; ethers such as diethylether, propylene oxide, and tetrahydrofuran (THF); amides such as N-methyl pyrrolidone (NMP), dimethylformamide, and dimethylacetamide; and aprotic polar solvents such as hexamethyl phosphoric amide and dimethyl sulfoxide.

Especially when an aqueous solvent is used, the solvent is preferably formed into a slurry using a thickener and a latex such as styrene-butadiene rubber (SBR). The thickener is usually used to adjust the viscosity of the slurry. Examples of the thickener include, but not particularly limited to, carboxymethyl cellulose, methyl cellulose, hydroxymethyl cellulose, ethyl cellulose, polyvinyl alcohol, oxidized starch, phosphorylated starch, casein, and their salts. These may be used alone or in any combination in any proportion. If a thickener is further used, the proportion of the thickener based on the active material is 0.1% by mass or higher, preferably 0.2% by mass or higher, and more preferably 0.3% by mass or higher, and the upper limit is preferably 5% by mass or lower, preferably 3% by mass or lower, and more preferably 2% by mass or lower. A proportion lower than the above range may significantly decrease the coating properties. A proportion higher than the above range may decrease the proportion of the active material in the positive electrode active material layer, which may decrease the cell capacity or increase the resistance between the positive electrode active materials.

(Current Collector)

The material of the positive electrode current collector is not particularly limited, and may be any known one.

Specific examples thereof include metallic materials such as aluminum, stainless steel, nickel plating, titanium, and tantalum; and carbon materials such as carbon cloth and carbon paper. In particular, metallic materials, particularly aluminum, are preferred.

Examples of the form of the current collector include metal foil, a metal cylinder, a metal coil, a metal plate, a metallic thin film, an expanded metal, a perforated metal, and a foaming metal in the case of metallic materials and a carbon plate, a carbon thin film, and a carbon cylinder in the case of carbon materials. Preferred among these is a metal thin film. Here, the thin film may appropriately be formed into a mesh. The thickness of the thin film may be any value, but is typically 1 µm or larger, preferably 3 µm or larger, and more preferably 5 µm or larger, and the upper limit is typically 1 mm or smaller, preferably 100 µm or smaller, and more preferably 50 µm or smaller. A thickness of the thin film smaller than the above range may lead to insufficient strength as a current collector. A thickness larger than the above range may deteriorate the handleability.

It is also preferred that the surface of the current collector be coated with a conductive auxiliary agent from the viewpoint of decreasing the electronic contact resistance between the current collector and the positive electrode active material layer. Examples of the conductive auxiliary agent include carbon and noble metals such as gold, platinum, and silver.

The thickness ratio between the current collector and the positive electrode active material layer is not particularly limited, but the value of the ratio (thickness of one side of the positive electrode active material layer right before pouring of the electrolytic solution)/(thickness of the current collector) is preferably 20 or lower, more preferably 15 or lower, and most preferably 10 or lower, and the lower limit is preferably 0.5 or higher, more preferably 0.8 or higher, and most preferably 1 or higher. A thickness ratio higher than the above range may cause the current collector to generate heat due to the Joule heat upon high-current density charging and discharging. A thickness ratio lower than the above range may increase the volume ratio of the current collector based on the positive electrode active material, reducing the cell capacity.

(Electrode Area)

In the case of using the electrolytic solution of the present invention, the area of the positive electrode active material layer is preferably larger than the outer surface area of the cell exterior case from the viewpoint of increasing the stability at high outputs and high temperatures. Specifically, the total electrode area of the positive electrode is preferably 15 times or more, more preferably 40 times or more of the surface area of the exterior of the secondary cell. The outer surface area of the cell exterior case, in the case of a closed-end square shape, is the total area calculated using the length, width, and thickness of the case filled with power generation elements other than the protrusions of the terminals. In the case of a closed-end cylindrical shape, the outer surface area is the geometric surface area calculated by approximating the case filled with power generation elements other than the protrusions of the terminals as a cylinder. The total electrode area of the positive electrode is the geometric surface area of the positive electrode combined layer that faces the combined layer containing a negative electrode active material. In the case that the positive electrode has a positive electrode combined layer on each surface with current collector foil therebetween, the total electrode area is the sum of the areas of the surfaces calculated separately.

(Thickness of Positive Electrode Plate)

The thickness of the positive electrode layer is not particularly limited, but from the viewpoints of high capacity and high output, the lower limit for the thickness of the combined layer on one surface of the current collector, except for the thickness of the metal foil of the core material, is preferably 10 μm or larger, and more preferably 20 μm or larger, while the upper limit is preferably 500 μm or smaller, and more preferably 450 μm or smaller.

(Surface Coating of Positive Electrode Plate)

The positive electrode plate may have a deposit having a different composition from the composition thereof on its surface. Examples of the surface deposit include oxides such as aluminum oxide, silicon oxide, titanium oxide, zirconium oxide, magnesium oxide, calcium oxide, boron oxide, antimony oxide, and bismuth oxide, sulfates such as lithium sulfate, sodium sulfate, potassium sulfate, magnesium sulfate, calcium sulfate, and aluminum sulfate, carbonates such as lithium carbonate, calcium carbonate, and magnesium carbonate, and carbon.

<Separator>

The material and shape of the separator usable for the present invention is not particularly limited, and may be any known one if the effects of the present invention are not significantly deteriorated. In particular, resin, glass fibers, and an inorganic material which are formed from materials stable in an electrolytic solution of the present invention are used, and materials in the form of porous sheets or unwoven cloth which have excellent solution retention are preferred.

The material for the resin or the glass fiber separator is, for example, a polyolefin (e.g. polyethylene, polypropylene), aromatic polyamide, polytetrafluoroethylene, polyether sulfone, or glass filter. These materials may be used alone or in any combination in any proportion (e.g. a polypropylene/polyethylene two-layered film, a polypropylene/polyethylene/polypropylene three-layered film).

The thickness of the separator may be any value, but is typically 1 μm or larger, preferably 5 μm or larger, and more preferably 8 μm or larger, while it is typically 50 μm or smaller, preferably 40 μm or smaller, and more preferably 30 μm or smaller. A separator with a thickness smaller than the above range may exhibit decreased insulation and decreased mechanical strength. Also, a separator with a thickness larger than the above range may not only decrease the cell characteristics such as the rate characteristics but also decrease the energy density as the whole nonaqueous electrolytic cell.

Furthermore, in the case that a porous material such as a porous sheet or nonwoven fabric is used as the separator, the porosity of the separator may be any value, but is typically 20% or higher, preferably 35% or higher, and more preferably 45% or higher, while it is typically 90% or lower, more preferably 85% or lower, and still more preferably 75% or lower. A porosity smaller than the above range tends to give a high film resistance to deteriorate the rate characteristics. A porosity greater than the above range tends to decrease the mechanical strength of the separator and lower the insulation.

The average pore size of the separator may also be any value, but is typically 0.5 μm or smaller, and preferably 0.2 μm or smaller, while it is typically 0.05 μm or greater. An average pore size larger than the above range is likely to cause short circuit. An average pore size smaller than the above range may increase the film resistance and deteriorate the rate characteristics.

The material of the inorganic material is, for example, an oxide (e.g. alumina, silicon dioxide), a nitride (e.g. aluminum nitride, silicon nitride), or a sulfate (e.g. barium sulfate, calcium sulfate), in the form of particles or fibers.

The form of the separator is a thin film such as nonwoven fabric, woven fabric, and a fine porous film. A suitable thin film is one that has a pore size of 0.01 to 1 μm, and a thickness of 5 to 50 μm. Except for the above independent thin-film form, the separator can also be a separator obtained by forming a composite porous layer containing the inorganic particles on the surface layer of the positive electrode and/or the negative electrode, via a resin binder. For example, alumina particles with a 90% particle size of smaller than 1 μm can be adhered to each surface of the positive electrode via a fluororesin as a binder, such that a porous layer can be formed.

<Cell Design>

(Electrode Group)

The electrode group may be a laminated structure including the positive electrode plate and the negative electrode plate with the above separator therebetween, or a structure in which the positive electrode plate and the negative electrode plate, with the above separator therebetween, are rolled into a spiral. The proportion of the volume of the electrode group in the volume of the cell (hereinafter, the proportion is referred to as an electrode group content) is typically 40% or higher, and preferably 50% or higher, while it is typically 90% or lower, and preferably 80% or lower.

An electrode group content lower than the above range may decrease the cell capacity. Also, an electrode group content higher than the above range may result in a small void space. In this case, the components may expand or the vapor pressure from the liquid component of the electrolyte may increase when the temperature of the cell becomes high, which may increase the internal pressure to decrease the characteristics such as the charge and discharge repetition performance as a cell or the high-temperature storage, or to turn on a purge valve for releasing the internal pressure to the outside.

(Collecting Structure)

The collecting structure is not particularly limited, but is preferably a structure that reduces the resistance at the wiring parts and joint parts in order to more effectively achieve the effect of the present invention of improving the charge and discharge characteristics in the high-current density. If the internal resistance is reduced in this way, the effects of using the electrolytic solution of the present invention can be particularly favorably achieved.

If the electrode group has the above laminated structure, a structure formed by binding the metal cores of the respective electrode layers and welding the bind to the terminals is suitable. Here, the internal resistance increases as the area of one electrode layer increases. Hence, it is also suitable to form multiple terminals in an electrode to decrease the resistance. If the electrode group has the above rolled structure, the internal resistance can be decreased by providing multiple lead structures to each of the positive electrode and the negative electrode, and binding the leads to the terminal.

(Exterior Case)

The material of the exterior case may be any material stable with the electrolytic solution used. Specifically, a metal such as a nickel-plated steel plate, stainless steel, aluminum, aluminum alloy, or a magnesium alloy, or a laminated film of a resin and aluminum foil is used. From the viewpoint of weight saving, metals such as aluminum and aluminum alloy, and a laminated film are suitable.

Examples of the exterior case of a metal include a case having a sealed structure obtained by welding metals by laser welding, resistance welding, or ultrasonic welding, and a case having a caulked structure of the metals with a resin gasket. Examples of the exterior case using the above laminated film include a case having a sealed airtight structure obtained by thermal fusion bonding of resin layers. In order to improve the sealing property, a resin different from the resin used for laminated films may be provided between the resin layers. In particular, in the case of forming a sealed structure by thermal fusion bonding of the resin layers with a current collector terminal therebetween, the bonding is bonding of a metal and a resin, and thus a suitable resin to be provided therebetween is a resin having a polar group or a modified resin with a polar group introduced therein.

The shape of the lithium cell (lithium-ion secondary cell) of the present invention may be any shape such as a cylindrical shape, a square shape, a laminate, a coin, and a large-sized shape. The shape and composition of each of the positive electrode, the negative electrode, and the separator can be changed according to the shape of the cell.

In the lithium cell (lithium-ion secondary cell) of the present invention, the positive electrode is preferably at a potential of 4.3 V or higher based on metallic lithium. Even at such a high voltage, the lithium cell exhibits excellent electric characteristics.

Yet another aspect of the present invention is a module including the lithium secondary cell (lithium-ion secondary cell) of the present invention.

EXAMPLES

In the following, the present invention is described based on examples and comparative examples. The present invention is not limited to the examples. The compounds used in the following examples and comparative examples are described as follows.

Examples 1 to 15 and Comparative Examples 1 and 2

In accordance with the formulations shown in Tables 1 and 2, dry LiPF$_6$ was dissolved in a mixture of the following component (I), component (II-a), component (III-a), and component (III-b) under dry argon atmosphere. Thereby, an electrolytic solution was prepared.

The compounds used are listed below.

Component (I)
Component (I-a):

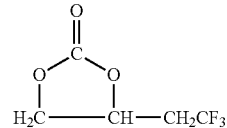

Component (I-b):

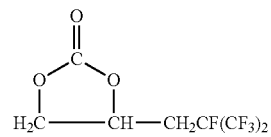

Component (I-c):

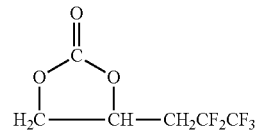

Component (II-a):

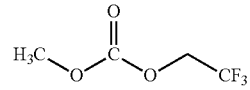

Component (III-a): ethylene carbonate (EC)
Component (III-b): fluoroethylene carbonate (FEC)
Component (IV): LiPF$_6$ A secondary cell was produced using the obtained electrolytic solution, and the high-temperature storage characteristics of the secondary cell were evaluated. The evaluation results are shown in Tables 1 and 2.

(Production of Negative Electrode)

Production Example 1

Production of Negative Electrode A

A negative electrode mixture slurry was prepared by mixing artificial graphite powder as a negative electrode active material, an aqueous dispersion of sodium carboxymethyl cellulose (concentration of sodium carboxymethyl cellulose: 1% by mass) as a thickener, and an aqueous dispersion of styrene-butadiene rubber (concentration of styrene-butadiene rubber: 50% by mass) as a binder in a ratio of 97.6/1.2/1.2 (% by mass) in an aqueous solvent. The slurry was uniformly applied to 20-μm-thick copper foil and dried. The resulting product was compression-molded into a negative electrode A by a pressing machine.

(Production of Positive Electrode)

Positive electrode active materials, namely $LiNi_{1/3}Mn_{1/3}Co_{1/3}O_2$ as a positive electrode active material, acetylene black as a conductive auxiliary agent, and polyvinylidene fluoride (PVdF) as a binder, were mixed in a ratio of 92/3/5 (% by mass). The mixture was dispersed in N-methyl-2-pyrrolidone to form a slurry. Thereby, a positive electrode mixture slurry was prepared. The obtained positive electrode mixture slurry was uniformly applied to a 21-μm-thick aluminum foil current collector and dried. The resulting product was compression-molded into a positive electrode by a pressing machine.

(Production of Secondary Cell A)

The negative electrode A produced in Production example 1, the positive electrode, and a polyethylene separator were laminated in the order of the negative electrode, the separator, and the positive electrode, whereby a cell element was produced.

The cell element was inserted into an envelope formed using a laminated film obtained by coating both sides of an aluminum base (thickness: 40 μm) with a resin layer, such that the terminals of the positive electrode and the negative electrode were protruded from the envelope. The electrolytic solutions of the examples and comparative examples were each poured into an envelope, and the envelope was vacuum-sealed. Thereby, sheet lithium-ion secondary cells A were produced.

<High-Temperature Storage Characteristics Evaluation Test>

The secondary cell A was sandwiched and pressurized between plates, and in this state, the cell was subjected to constant current/constant voltage charging (hereinafter, also referred to as CC/CV charging) with a current corresponding to 0.2 C up to 4.35 V (cut-off current: 0.1 C) at 25° C. Then, the cell was discharged to 3 V with a constant current of 0.2 C. This process was counted as one cycle, and the initial discharge capacity was determined from the discharge capacity at the third cycle. Here, 1 C represents a current value required for discharging the reference capacity of a cell over one hour. For example, 0.2 C refers to a current value that is ⅕ of 1 C.

After the initial discharge capacity evaluation, the cell was subjected to the CC/CV charging (cut-off current: 0.1 C) to 4.35 V, and was stored at a high temperature of 85° C. for 12 hours. The cell was sufficiently cooled, and discharged to 3 V with a current of 0.2 C at 25° C. The capacity remaining after the high-temperature storage was measured, so that the proportion of the remaining capacity to the initial discharge capacity was determined, which was taken as the storage capacity retention factor ((remaining capacity)/(initial discharge capacity)×100=storage capacity retention factor (%)).

TABLE 1

| Cell A | Example 1 | Example 2 | Example 3 | Example 4 | Example 5 | Example 6 | Example 7 | Example 8 | Example 9 | Example 10 | Example 11 | Example 12 | Comparative Example 1 | Comparative Example 2 |
|---|---|---|---|---|---|---|---|---|---|---|---|---|---|---|
| Electrolytic solution composition | | | | | | | | | | | | | | |
| Component (I) | I-b | I-b | I-b | I-b | I-b | I-c | I-c | I-c | I-c | I-c | I-c | I-c | — | I-a |
| Proportion (vol %) | 10 | 15 | 20 | 30 | 50 | 10 | 15 | 20 | 30 | 50 | 20 | 15 | — | 30 |
| Component (II-a) Proportion (vol %) | 70 | 70 | 70 | 70 | 50 | 70 | 70 | 70 | 70 | 50 | 70 | 70 | 70 | 70 |
| Component (III-a) Proportion (vol %) | 20 | 15 | 10 | — | — | 20 | 15 | 10 | — | — | — | — | 30 | — |
| Component (III-b) Proportion (vol %) | — | — | — | — | — | — | — | — | — | — | 10 | 15 | — | — |
| Electrolyte salt | | | | | | | | | | | | | | |
| Component (IV) (mol/L) | 1.0 | 1.0 | 1.0 | 1.0 | 1.0 | 1.0 | 1.0 | 1.0 | 1.0 | 1.0 | 1.0 | 1.0 | 1.0 | 1.0 |
| Storage capacity retention factor (%) | 90 | 92.1 | 93.4 | 95.2 | 94.4 | 91.8 | 92.3 | 93.9 | 95.8 | 94.6 | 94.1 | 93.0 | 83.0 | 83.1 |

TABLE 2

| Cell A | Example 13 | Example 14 | Example 15 |
|---|---|---|---|
| Electrolytic solution composition | | | |
| Component (I) | I-c | I-c | I-c |
| Proportion (vol %) | 30 | 30 | 30 |
| Component (II-a) Proportion (vol %) | 70 | 70 | 70 |
| Component (III-a) Proportion (vol %) | — | — | — |
| Electrolyte salt | | | |
| Component (IV) (mol/L) | 0.8 | 1.2 | 1.5 |
| Storage capacity retention factor (%) | 93.1 | 96.0 | 95.7 |

INDUSTRIAL APPLICABILITY

A nonaqueous electrolytic cell obtained using the electrolytic solution of the present invention has a high capacity retention factor, excellent input/output performance, and excellent input/output performance at low temperatures, and thus is useful even after durability tests such as the high-temperature storage test and the cycle tests. Accordingly, the electrolytic solution of the present invention and the nonaqueous electrolytic cell formed using the electrolytic solution can be used for various known applications. Specific examples thereof include laptops, pen-input PCs, mobile PCs, electronic book players, cellphones, portable fax machines, portable copy machines, portable printers, headphone stereos, video movie cameras, liquid crystal TVs, handy cleaners, portable CD players, mini disk players, transceivers, electronic notebooks, calculators, memory cards, portable tape recorders, radios, backup power sources, motors, vehicles, motorbikes, bicycles with a motor, bicycles, lighting apparatuses, toys, video game machines, clocks, power tools, stroboscopes, cameras, power sources for load leveling, and natural energy storage power sources.

The invention claimed is:

1. A lithium cell comprising:
a negative electrode and a positive electrode that are capable of occluding or releasing lithium ions;
a separator; and
an electrolytic solution,
wherein the electrolytic solution comprises:
a nonaqueous solvent;
an electrolyte salt;
10 vol % to 50 vol % of a compound represented by the following formula (1) based on 100 vol % of the nonaqueous solvent,

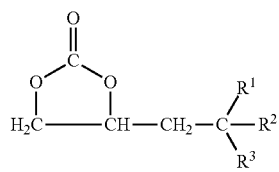

(1)

wherein $R^1$, $R^2$ and $R^3$ may be the same as or different from one another, each representing a hydrogen atom, a fluorine atom, a $C_1$-$C_{20}$ alkyl group, or a $C_1$-$C_{20}$ fluorinated alkyl group, at least one of $R^1$, $R^2$, and $R^3$ is a fluorine atom or a fluorinated alkyl group, excluding cases where all of $R^1$, $R^2$, and $R^3$ are hydrogen atoms or fluorine atoms; and
50 vol % to 90 vol % of a linear carbonate based on 100 vol % of the nonaqueous solvent,
wherein the electrolyte salt is $LiPF_6$, and the electrolyte salt is contained in an amount of 0.2 mol/L or more,
wherein the positive electrode capable of occluding or releasing lithium ions contains a positive electrode active material formed from a lithium transition metal oxide,
wherein the lithium transition metal oxide includes lithium-nickel composite oxides, lithium-manganese composite oxides, or products obtained by partially substituting transition metal atoms mainly constituting the above lithium transition metal composite oxides with Al, Mn, Co, or Ni,
wherein the compound represented by the formula (1) is at least one compound selected from group consisting of a compound represented by formula (I-b) and formula (I-c).

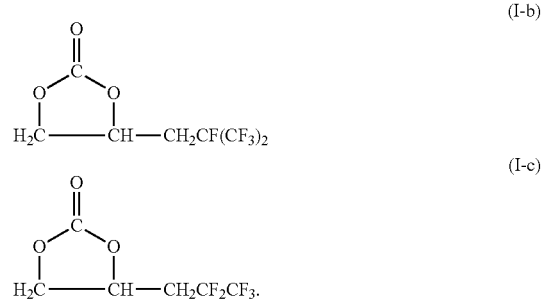

2. The lithium cell according to claim 1,
wherein the lithium transition metal oxide includes $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiNi_{0.45}Co_{0.10}Al_{0.45}O_2$ and $LiMn_{1.8}Al_{0.2}O_4$, or $LiMn_{1.5}Ni_{0.5}O_4$.

3. The lithium cell according to claim 1,
wherein the positive electrode capable of occluding or releasing lithium ions contains a positive electrode active material formed from a lithium transition metal oxide represented by the following formula (2):

$$Li_{1+w}Mn_xNi_yCo_zO_2 \quad (2)$$

wherein w, x, y, and z satisfy the relations $0 \leq w < 0.4$, $0.3 < x < 1$, $0 \leq y < 0.4$, $0 \leq z < 0.4$, $0 < y+z$, and $w+x+y+z=1$.

4. The lithium cell according to claim 1,
wherein the negative electrode capable of occluding or releasing lithium ions contains at least one negative electrode active material selected from the group consisting of carbonaceous materials and metallic materials.

5. The lithium cell according to claim 1,
wherein the positive electrode is at a potential of 4.3 V or higher based on metallic lithium.

6. A module comprising the lithium cell according to claim 1.

* * * * *